United States Patent
Norikane et al.

(10) Patent No.: US 9,522,370 B2
(45) Date of Patent: Dec. 20, 2016

(54) METHOD FOR PRODUCING FINE PARTICLES AND APPARATUS FOR PRODUCING FINE PARTICLES

(71) Applicants: Yoshihiro Norikane, Kanagawa (JP); Satoshi Takahashi, Kanagawa (JP); Masaru Ohgaki, Kanagawa (JP)

(72) Inventors: Yoshihiro Norikane, Kanagawa (JP); Satoshi Takahashi, Kanagawa (JP); Masaru Ohgaki, Kanagawa (JP); Andrew Mwaniki Mulwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 14/382,471

(22) PCT Filed: Feb. 28, 2013

(86) PCT No.: PCT/JP2013/056221
§ 371 (c)(1),
(2) Date: Sep. 2, 2014

(87) PCT Pub. No.: WO2013/133350
PCT Pub. Date: Sep. 12, 2013

(65) Prior Publication Data
US 2015/0108671 A1 Apr. 23, 2015

(30) Foreign Application Priority Data
Mar. 5, 2012 (JP) .................................. 2012-047870
Feb. 27, 2013 (JP) .................................. 2013-037013

(51) Int. Cl.
G03G 9/08 (2006.01)
B01J 2/18 (2006.01)
(Continued)

(52) U.S. Cl.
CPC .. *B01J 2/06* (2013.01); *B01J 2/04* (2013.01); *B01J 2/18* (2013.01); *G03G 9/0802* (2013.01); *G03G 9/0804* (2013.01)

(58) Field of Classification Search
None
See application file for complete search history.

(56) References Cited

U.S. PATENT DOCUMENTS

| | | |
|---|---|---|
| 2005/0154088 A1 | 7/2005 | Miura et al. |
| 2006/0210909 A1 | 9/2006 | Ohtani |

(Continued)

FOREIGN PATENT DOCUMENTS

| | | |
|---|---|---|
| EP | 2 431 811 A2 | 3/2012 |
| JP | 57-201248 | 12/1982 |

(Continued)

OTHER PUBLICATIONS

International Search Report Issued May 14, 2013 in PCT/JP2013/056221 Filed Feb. 28, 2013.

(Continued)

*Primary Examiner* — Mary F Theisen
(74) *Attorney, Agent, or Firm* — Oblon, McClelland, Maier & Neustadt, L.L.P.

(57) ABSTRACT

A method for producing fine particles, including: discharging a fine particle material liquid, where solid materials to be formed into fine particles are dissolved or dispersed in a solvent or are melted, from two or more discharge holes in a downward vertical direction, to thereby form liquid droplets; and solidifying the liquid droplets discharged to form fine particles, wherein in the discharging a fine particle material liquid, gas flow is supplied at angle of greater than 0° but 90° or smaller to the downward vertical direction, and wherein an initial discharge velocity of the liquid droplets discharged from the discharge hole located at an upstream (Continued)

side of the gas flow in a flowing direction thereof is equal to or higher than an initial discharge velocity of the liquid droplets discharged from the discharge hole located at a downstream side of the gas flow in the flowing direction thereof.

10 Claims, 16 Drawing Sheets

(51) Int. Cl.
  *B01J 2/04* (2006.01)
  *B01J 2/06* (2006.01)

(56) References Cited

U.S. PATENT DOCUMENTS

| | | |
|---|---|---|
| 2010/0297548 A1 | 11/2010 | Honda et al. |
| 2011/0045403 A1 | 2/2011 | Yamashita et al. |
| 2011/0223532 A1 | 9/2011 | Sugimoto et al. |
| 2011/0305987 A1 | 12/2011 | Yohichiroh et al. |
| 2011/0318053 A1 | 12/2011 | Yamashita et al. |
| 2012/0052431 A1 | 3/2012 | Hozumi et al. |
| 2012/0052434 A1 | 3/2012 | Sugimoto et al. |
| 2012/0070777 A1 | 3/2012 | Makabe et al. |
| 2012/0122027 A1 | 5/2012 | Watanabe et al. |
| 2012/0219896 A1 | 8/2012 | Asahina et al. |
| 2012/0237869 A1 | 9/2012 | Chiba et al. |
| 2012/0237870 A1 | 9/2012 | Watanabe et al. |
| 2012/0264043 A1 | 10/2012 | Watanabe et al. |
| 2012/0264049 A1 | 10/2012 | Masuda et al. |
| 2012/0270147 A1 | 10/2012 | Katoh et al. |
| 2012/0270148 A1 | 10/2012 | Norikane et al. |
| 2013/0010035 A1 | 1/2013 | Norikane et al. |
| 2013/0034810 A1 | 2/2013 | Norikane et al. |

FOREIGN PATENT DOCUMENTS

| | | |
|---|---|---|
| JP | 2005-215091 | 8/2005 |
| JP | 3786034 | 3/2006 |
| JP | 3786035 | 3/2006 |
| JP | 2006-293320 | 10/2006 |
| JP | 2006-297325 | 11/2006 |
| JP | 2008-203640 | 9/2008 |
| JP | 2011-126073 | 6/2011 |
| JP | 2011-194675 | 10/2011 |
| JP | 2011-212668 | 10/2011 |
| JP | 2012-002940 | 1/2012 |
| WO | WO 2011/115303 A1 | 9/2011 |

OTHER PUBLICATIONS

Extended European Search Report issued on Jun. 30, 2015 in European Patent Application No. 13757347.3.

N=5
L=5λ/4

— Velocity distribution
--- Pressure distribution

Direction of coalescence preventing gas flow

METHOD FOR PRODUCING FINE PARTICLES AND APPARATUS FOR PRODUCING FINE PARTICLES

TECHNICAL FIELD

The present invention relates to a method for producing fine particles and an apparatus for producing fine particles.

BACKGROUND ART

Image forming apparatus such as electrophotographic apparatus and electrostatic recording devices form an image through a process including: developing a latent electrostatic image formed on a photoconductor with a developer containing a toner to thereby form a toner image; transferring the toner image onto a recording medium such as paper; and fixing the toner image on the recording medium by application of heat and pressure.

In recent years, there is a need to form high-quality images, and toners are designed for making image quality higher. In order to respond to such a need to form high-quality images, attempts have been made to make the diameters of toner particles smaller and reproduce a latent image with fidelity.

A widely employed method for producing fine particles having small particle diameters such as toner particles is a polymerization method where fine particles are formed in an aqueous medium. Toner fine particles obtained by the polymerization method generally have the following features: they are small in particle diameter and their particle size distribution is narrow; and the shape of the particles is close to a spherical shape. The polymerization method, however, has a drawback that it requires a lot of time, water and energy. Specifically, it takes a long time to complete the polymerization process, and also it has to be repeated to separate toner fine particles from a solvent after completion of solidification and then wash and dry the toner fine particles.

As an alternative method to the polymerization method, development has been made on a so-called spray granulation method (see, for example, PTLs 1 to 4). The spray granulation method is a method where toner fine particles are obtained by forming a liquid containing toner raw materials dissolved or dispersed in an organic solvent into fine particles using various atomizers, followed by drying. This spray granulation method does not have to use water, enabling considerable reduction of steps for washing and drying.

In the methods for producing fine particles described in PTLs 1 to 3, however, after spraying of a toner material liquid and before drying of liquid droplets formed, the liquid droplets are coalesced together and a solvent is dried in this state to form toner particles in some cases. Therefore, there is a problem that the formed toner particles result in having a broad particle size distribution.

The toner production method described in PTL 4 may involve the following unfavorable phenomenon when a spraying step is continuously performed. Specifically, discharging from some discharge holes stops, and a toner material liquid is flown through these discharge holes and stops discharging from other discharge holes. That is, there is a problem that discharge efficiency and stability of a toner material liquid are low.

CITATION LIST

Patent Literature

PTL 1: Japanese Patent (JP-B) No. 3786034
PTL 2: JP-B No. 3786035
PTL 3: Japanese Patent Application Laid-Open (JP-A) No. 57-201248
PTL 4: JP-A No. 2006-293320

SUMMARY OF INVENTION

Technical Problem

The present invention aims to solve the above problems pertinent in the art and achieve the following object. That is, an object of the present invention is to provide a method for producing fine particles which can continuously and stably discharge fine particles having a narrow particle size distribution.

Solution to Problem

Means for solving the above problems are as follows.
That is, a method of the present invention for producing fine particles includes:
discharging a fine particle material liquid, where solid materials to be formed into fine particles are dissolved or dispersed in a solvent or are melted, from two or more discharge holes in a downward vertical direction, to thereby form liquid droplets; and
solidifying the liquid droplets discharged to form fine particles,
wherein in the discharging a fine particle material liquid, gas flow is supplied at an angle of greater than 0° but 90° or smaller with respect to the downward vertical direction, and
wherein an initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof.

Advantageous Effects of Invention

The present invention can provide a method for producing fine particles which can continuously and stably discharge fine particles having a narrow particle size distribution. This method can solve the above problems pertinent in the art.

DESCRIPTION OF EMBODIMENTS

Figure 1:
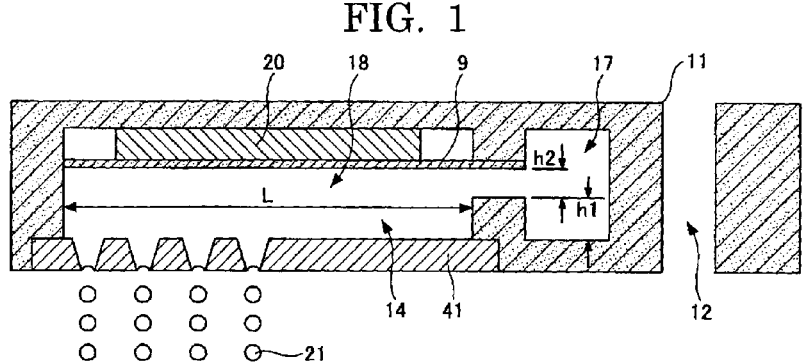
FIG. 1 is a cross-sectional view of one exemplary configuration of a liquid droplet discharging unit of a liquid column resonance type in a method of the present embodiment for producing fine particles.

Method for Producing Fine Particles and Apparatus for Producing Fine Particles

A method of the present invention for producing fine particles includes a liquid droplet forming step and a liquid droplet solidifying step; and, if necessary, further includes other steps.

An apparatus of the present invention for producing fine particles includes a gas flow generating unit, a gas flow path and a liquid droplet discharging unit; and, if necessary, further includes other units.

The gas flow generating unit is a unit configured to generate gas flow having an angle of greater than 0° but 90° or smaller with respect to a downward vertical direction.

The gas flow path is a gas flow path through which the gas flow generated by the gas flow generating unit flows.

The liquid droplet discharging unit is a unit containing two or more discharge holes and configured to discharge, to the gas flow path, a fine particle material liquid where solid materials to be formed into fine particles are dissolved or dispersed in a solvent or are melted.

In the apparatus for producing fine particles, an initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof.

<Liquid Droplet Forming Step>

The liquid droplet forming step is not particularly limited and may be appropriately selected depending on the intended purpose so long as it is a step of discharging a fine particle material liquid, where solid materials to be formed into fine particles are dissolved or dispersed in a solvent or are melted, from two or more discharge holes in a downward vertical direction, to thereby form liquid droplets.

In the liquid droplet forming step, gas flow is supplied at an angle of greater than 0° but 90° or smaller with respect to the downward vertical direction. Preferably, the gas flow is supplied at an angle of 90° with respect to the downward vertical direction.

An initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof.

Preferably, in at least one of adjacent pairs of the discharge holes in the two or more discharge holes, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$.

The at least one of adjacent pairs of the discharge holes are preferably a pair of the discharge hole located at the most upstream side of the gas flow in the flowing direction thereof and the discharge hole adjacent to this discharge hole.

In each of the adjacent pairs of the discharge holes in the two or more discharge holes, preferably, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$.

The discharge hole located at the downstream side of the gas flow in the flowing direction thereof has an opening diameter $D_1$ and the discharge hole located at the upstream side of the gas flow in the flowing direction thereof has an opening diameter $D_2$, where the opening diameter $D_1$ is equal to or greater than $1.1 \times D_2$.

The liquid droplet forming step is preferably a step of applying vibration to the fine particle material liquid in a liquid column resonance-generating liquid chamber containing the two or more discharge holes to thereby form a standing wave through liquid column resonance, and discharging the fine particle material liquid from the discharge holes located in a region corresponding to an antinode of the standing wave to thereby form liquid droplets.

The frequency f of the vibration preferably satisfies the relationship: $N \times c/(4L) \leq f \leq (N+1) \times c/(4Le)$.

In the above formula, L denotes a length of the liquid column resonance-generating liquid chamber in the longitudinal direction thereof, Le denotes a distance between an end portion of the liquid column resonance-generating liquid chamber at a side of a supply path for supplying the fine particle material liquid to the liquid column resonance-generating liquid chamber and the discharge hole closest to the end portion thereof, c denotes a velocity of a sound wave in the fine particle material liquid, and N is an integer.

The initial discharge velocities of the liquid droplets are preferably lower than the velocity of the gas flow.

The initial velocities of the liquid droplets discharged from the two or more discharge holes are preferably adjusted by changing pitches between the discharge holes or opening diameters of the discharge holes.

<Liquid Droplet Solidifying Step>

The liquid droplet solidifying step is not particularly limited and may be appropriately selected depending on the intended purpose so long as it is a step of solidify the liquid droplets discharged to form fine particles.

Next, referring to the drawings, the method of the present invention for producing fine particles will be described in detail.

[Liquid Droplet Discharging Unit]

The liquid droplet discharging unit usable in the present embodiment is not particularly limited and may be a known one. Specific examples of the usable liquid droplet discharging units include: a fluid nozzle; a liquid droplet discharging unit of a film vibration type; a liquid droplet discharging unit of a Rayleigh fission type; a liquid droplet discharging unit of a liquid vibration type; and a liquid droplet discharging unit of a liquid column resonance type. The liquid droplet discharging unit of a film vibration type is, for example, one described in JP-A No. 2008-292976. The liquid droplet discharging unit of a Rayleigh fission type is, for example, one described in JP-B No. 4647506. The liquid droplet discharging unit of a liquid vibration type is, for example, one described in JP-A No. 2010-102195.

Among the aforementioned liquid droplet discharging units, the liquid droplet discharging unit of a liquid column resonance type is preferably used. The liquid droplet discharging unit of a liquid column resonance type is a unit configured to apply vibration to a liquid in a liquid column resonance-generating liquid chamber containing a plurality of discharge holes to thereby form a standing wave through liquid column resonance, and discharge the liquid from the discharge holes formed in a region corresponding to an antinode of the standing wave. The liquid droplet discharging unit of a liquid column resonance type is preferred since the particle size distribution of the resultant liquid droplets are narrow and productivity of fine particles is high.

[Liquid Droplet Discharging Unit of a Liquid Column Resonance Type]

The liquid droplet discharging unit of a liquid column resonance type will be described. Note that, a liquid to be discharged by the below-described liquid droplet discharging unit is, for example, a liquid where materials of fine particles to be formed are dissolved and/or dispersed in a solvent (hereinafter this liquid may be referred to as fine particle material-containing liquid) or a liquid where materials of fine particles are melted under discharge conditions (hereinafter this liquid may be referred to as fine particle material-melted liquid).

Here, for illustrative purposes, a case where toner particles are produced as the fine particles will be described. Thus, each of the fine particle material-containing liquid and the fine particle material-melted liquid is referred to a toner material liquid. The present invention is not limited thereto.

FIG. 1 is a cross-sectional view of one exemplary configuration of a liquid droplet discharging unit of a liquid column resonance type in the method of the present embodiment for producing fine particles. FIG. 2 is a cross-sectional view of one exemplary configuration of a liquid column resonance liquid droplet forming unit in the method of the present embodiment for producing fine particles. Note that, the arrow horizontally extending from right to left in FIG. 2 denotes a direction of the liquid flowing from the circulating pump 15 to the raw material container 13.

A liquid column resonance liquid droplet discharging unit 11 (a liquid droplet discharging head) has a common liquid feeding path 17 and a liquid column resonance-generating liquid chamber 18. The liquid column resonance-generating liquid chamber 18 is in communication with a common liquid feeding path 17 provided in one of the wall surfaces of the liquid column resonance-generating liquid chamber 18 in the longitudinal direction thereof. Also, the liquid column resonance-generating liquid chamber 18 has discharge holes 19 in one of the wall surfaces of the liquid column resonance-generating liquid chamber 18 in the transverse direction thereof, and toner liquid droplets 21 are discharged from these discharge holes.

In addition, the liquid column resonance-generating liquid chamber 18 has a vibration generating unit 20 which is provided at a wall surface facing the discharge holes 19 and is configured to generate a high frequency vibration for forming a liquid column resonance standing wave. Note that a high-frequency power source is connected to the vibration generating unit 20.

A flow path for liquid feeding is in communication with each liquid column resonance-generating liquid chamber from the common liquid feeding path 17, and the common liquid feeding path 17 is in communication with a plurality of the liquid column resonance-generating liquid chambers 18.

A toner material liquid 14 is allowed by a liquid circulating pump to flow into the common liquid feeding path 17 of the liquid column resonance-based liquid droplet discharging unit 10. The toner material liquid 14 is supplied to the liquid column resonance-generating liquid chamber 18. A pressure distribution is formed in the liquid column resonance-generating liquid chamber 18 by a liquid column resonance standing wave generated by the vibration generating unit 20. The toner liquid droplets 21 are discharged from the discharge holes 19 located in a region corresponding to an antinode of the standing wave, where the amplitude and change in pressure of the liquid column resonance standing wave are large.

The discharge holes 19 are arranged in a region corresponding to an antinode of the liquid column resonance standing wave, where the toner liquid droplets 21 are discharged. As used herein, the region corresponding to an antinode of the standing wave is a region where the amplitude of the pressure wave of the liquid column resonance standing wave is large, and a change in pressure enough to discharge liquid droplets is obtained. In other words, the region corresponding to an antinode of the standing wave means regions other than regions corresponding to a node of the standing wave. When the discharge holes are formed in the region corresponding to an antinode of the pressure standing wave, liquid droplets can substantially uniformly be discharged from each of the discharge holes. In addition, the liquid droplets can efficiently be discharged to involve less clogging of the discharge holes, which is preferred. A more preferred region where the discharge holes are arranged is a region within a range of ±⅛ wavelength from a position where the amplitude of the pressure standing wave becomes maximum toward a position where the amplitude of the pressure standing wave becomes minimum.

The toner material liquid 14 having passed through the common liquid feeding path 17 is returned via a liquid returning tube to a raw material container. When the amount of the toner material liquid 14 in the liquid column resonance-generating liquid chamber 18 is reduced as the toner liquid droplets 21 are discharged, an attractive force is generated by the action of the liquid column resonance standing wave in the liquid column resonance-generating liquid chamber 18. With this attractive force, the amount of the toner material liquid 14 supplied from the common liquid feeding path 17 is increased, and the liquid column resonance-generating liquid chamber 18 is replenished with the toner material liquid 14. When the liquid column resonance-generating liquid chamber 18 is replenished with the toner material liquid 14, the amount of the toner material liquid 14 passing through the common liquid feeding path 17 is returned to a normal amount, re-forming a flow of the toner material liquid 14 circulating in the liquid feeding tube and the liquid returning tube in the apparatus.

The liquid column resonance-generating liquid chamber 18 is preferably formed by bonding frames together each being made of a material having such high rigidity that does not affect the resonance frequency of the toner material liquid at a drive frequency of the below-described vibration. Examples of the material include metals, ceramics and silicone.

The length L between the wall surfaces at both ends of the liquid column resonance-generating liquid chamber in the longitudinal direction thereof is not particularly limited and may be appropriately selected depending on the intended purpose. It is preferably determined according to the below-described principle of a liquid column resonance phenomenon. Also, the width W of the liquid column resonance-generating liquid chamber is not particularly limited and may be appropriately selected depending on the intended purpose. The width W is preferably smaller than ½ the length L of the liquid column resonance-generating liquid chamber so as not to give unnecessary frequency to liquid column resonance.

When L denotes a length of the liquid column resonance-generating liquid chamber in the longitudinal direction thereof and Le denotes a distance between an end portion of the liquid column resonance-generating liquid chamber at a side of the common liquid feeding path 17 and the discharge hole 19 closest to the end portion of the liquid column resonance-generating liquid chamber at the side of the common liquid feeding path 17, a ratio Le/L is not particularly limited and may be appropriately selected depending on the intended purpose. The ratio Le/L is preferably greater than 0.6.

From the viewpoint of productivity, it is preferable to arrange a plurality of liquid column resonance-generating liquid chambers in one liquid column resonance-based liquid droplet discharging unit. The number of the liquid column resonance-generating liquid chambers arranged in one liquid column resonance-based liquid droplet discharging unit is not particularly limited and may be appropriately selected depending on the intended purpose. As the number of the liquid column resonance-generating liquid chambers arranged in one liquid column resonance-based liquid droplet discharging unit increases, productivity becomes high but operability becomes poor. From the viewpoint of achieving a favorable balance between operability and productivity, the number of the liquid column resonance-generating liquid chambers is preferably 100 to 2,000. Also, a flow path for feeding the toner material liquid is in communication with each of the liquid column resonance-generating liquid chambers from the common liquid feeding path 17, and the common liquid feeding path 17 is in communication with a plurality of the liquid column resonance-generating liquid chambers 18.

The vibration generating unit 20 in the liquid column resonance liquid droplet discharging unit 11 is preferably a laminate where a piezoelectric element is attached to an elastic plate 9. The elastic plate is preferably formed as part of the wall of the liquid column resonance-generating liquid chamber so that the vibration generating unit is not in contact with the toner material liquid. Furthermore, each of the vibration generating units 20 is preferably provided in one liquid column resonance-generating liquid chamber so that they can be controlled individually. Moreover, preferably, a blocked-shape vibrating member is partially cut correspondingly the positions of the liquid column resonance-generating liquid chambers so that each of the liquid column resonance-generating liquid chambers can be controlled individually via an elastic plate.

The piezoelectric element is not particularly limited and may be appropriately selected depending on the intended purpose. Examples of the piezoelectric element include those made of materials such as piezoelectric ceramics (e.g., lead zirconate titanate (PZT)); piezoelectric polymers (e.g., polyvinylidene difluoride (PVDF)); and single crystals (e.g., crystals, $LiNbO_3$, $LiTaO_3$ and $KNbO_3$). These may be used as a laminated structure depending on the intended displacement amount.

The opening diameter of the discharge hole 19 is not particularly limited and may be appropriately selected depending on the intended purpose, but is preferably 1 μm to 40 μm. When the opening diameter thereof is smaller than 1 μm, the formed liquid droplets become considerably small, potentially resulting in failure to form toner particles. In addition, when the toner material liquid contains solid fine particles such as a colorant, clogging of the discharge holes often occurs potentially lead to a drop in productivity. When the opening diameter thereof is greater than 40 μm, the formed toner liquid droplets have large diameters, potentially requiring a step of diluting the toner material with an organic solvent after drying and solidifying. As a result, a large amount of drying energy may be required to obtain toner particles.

Figure 2:
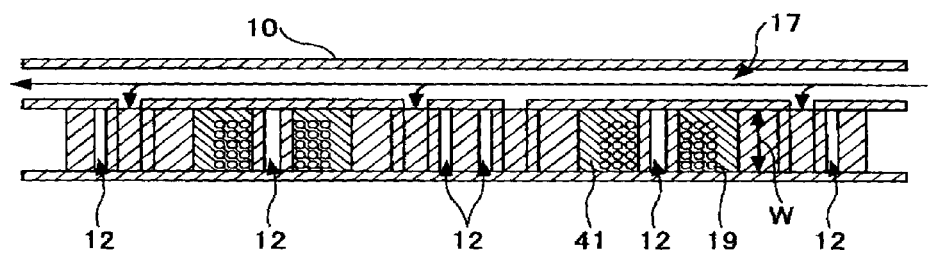
FIG. 2 is a cross-sectional view of one exemplary configuration of a liquid column resonance liquid droplet unit in a method of the present embodiment for producing fine particles.

As illustrated in FIG. 2, providing a plurality of the discharge holes 19 in the liquid column resonance-generating liquid chamber 18 in a width direction thereof is preferred because of increased production efficiency.

FIGS. 3A to 3D illustrate exemplary cross-sectional shapes of the discharge hole 19.

Figure 3A:
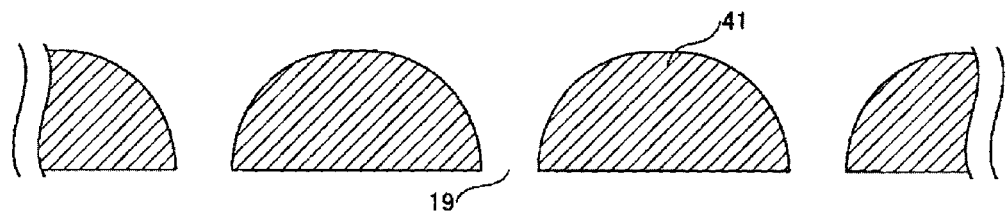
FIG. 3A is an explanatory, cross-sectional view of one example of a cross-sectional shape of a discharge hole (a round shape).

The cross-sectional shape illustrated in FIG. 3A has such a round shape that the opening diameter becomes narrower toward the discharge outlet from the contact surface of the discharge hole 19 with liquid. In the case of the discharge hole 19 having this cross-sectional shape, the pressure applied to liquid by vibration of a thin film 41 is maximum near the outlet of the discharge hole 19. Therefore, this is the most preferred shape from the viewpoint of stabilization of discharging.

Figure 3B:
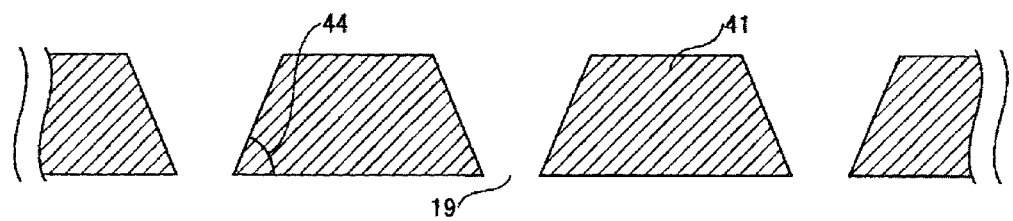
FIG. 3B is an explanatory, cross-sectional view of another example of a cross-sectional shape of a discharge hole (a tapered shape).
Figure 3C:
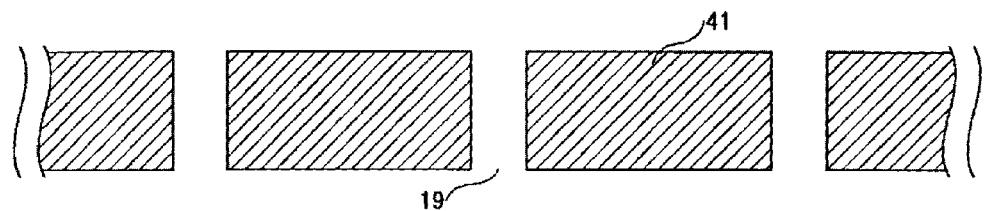
FIG. 3C is an explanatory, cross-sectional view of still another example of a cross-sectional shape of a discharge hole (a straight shape).
Figure 3D:
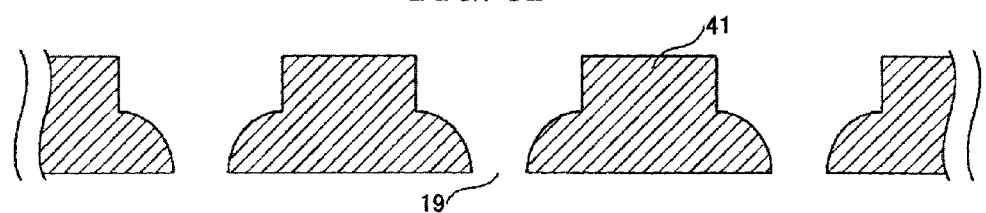
FIG. 3D is an explanatory, cross-sectional view of yet another example of a cross-sectional shape of a discharge hole (a combination of a round shape and a tapered shape).
Figure 4A:
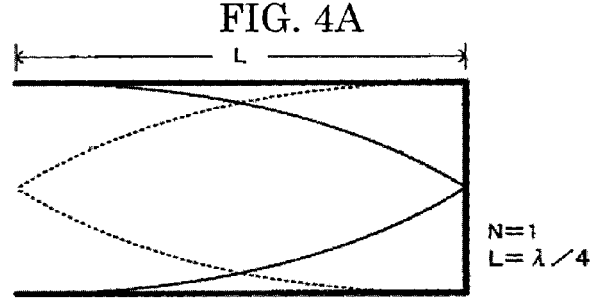
FIG. 4A is an explanatory, schematic view of standing waves representing changes in velocity and pressure when one end of a liquid column resonance generating chamber is a fixed end and N is 1.
Figure 4B:
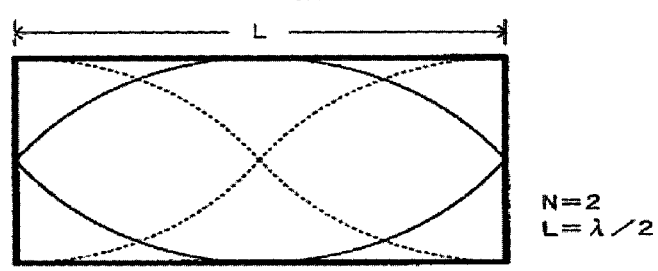
FIG. 4B is an explanatory, schematic view of standing waves representing changes in velocity and pressure when both ends of a liquid column resonance generating chamber are fixed ends and N is 2.
Figure 4C:
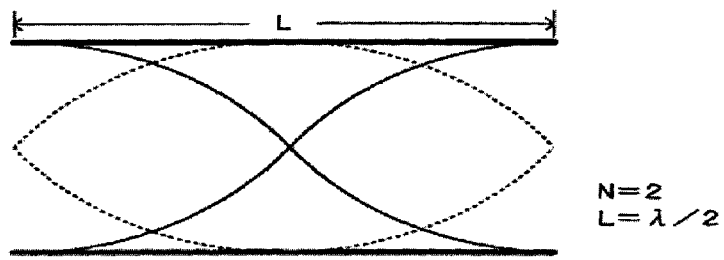
FIG. 4C is an explanatory, schematic view of standing waves representing changes in velocity and pressure when both ends of a liquid column resonance generating chamber are open ends and N is 2.
Figure 4D:
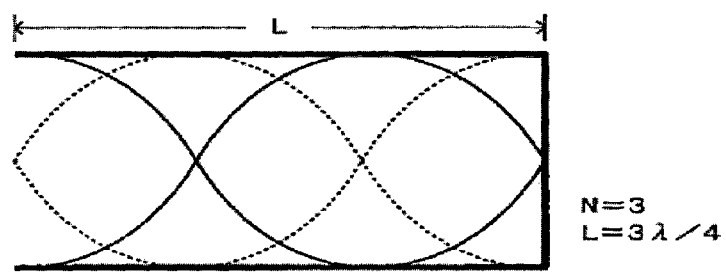
FIG. 4D is an explanatory, schematic view of standing waves representing changes in velocity and pressure when one end of a liquid column resonance generating chamber is a fixed end and N is 3.

The cross-sectional shape illustrated in FIG. 3B is such that the opening diameter becomes narrower at a certain angle toward the discharge outlet from the contact surface of the discharge hole 19 with liquid. The nozzle angle 44 can appropriately be modified by those skilled in the art. Similar to the case of FIG. 3A, the pressure applied to liquid by vibration of a thin film 41 can be increased near the outlet of the discharge hole 19 with this nozzle angle. The nozzle angle 44 preferably falls within a range of 60° to 90°. When the nozzle angle 44 is less than 60°, the pressure is hardly applied to liquid and also machining of the thin film 41 is difficult, which is not preferred. When the nozzle angle 44 is 90° (FIG. 3C), the pressure is hardly applied to liquid near the outlet of the discharge hole. When the nozzle angle 44 is 90° or greater, the pressure is not applied to the outlet of the hole 12, making discharge of liquid droplets considerably unstable. The cross-sectional shape of FIG. 3D is a combination of the shape of FIG. 3A and the shape of FIG. 3B. As seen in FIG. 3D, the cross-sectional shape may be changed stepwise.

The opening diameters of the discharge holes 19 may be all the same, or the opening diameter of at least one of the discharge holes may be different from that of the other discharge holes.

Notably, when the discharge hole 19 is truly circular, the opening size thereof means a diameter thereof. When the discharge hole 19 is ellipsoidal or (regular) polygon such as square, hexagon or octagon, the opening size thereof means an average diameter thereof.

The number of the discharge holes 19 per liquid column resonance-generating liquid chamber 18 is preferably two or more from the viewpoint of improving productivity. Specifically, the number thereof is preferably 2 to 100. When the number of the discharge holes 19 per liquid column resonance-generating liquid chamber 18 exceeds 100, the voltage applied to the vibration generating unit 20 must be set high and thus, the behavior of the vibration generating unit 20 may be unstable.

When two or more of the discharge holes 19 are formed, the pitches (intervals) between the discharge holes are 20 μm or more. When the pitches between the discharge holes are less than 20 μm, liquid droplets discharged from the adjacent discharge holes may hit together.

[Mechanism of Liquid Droplet Formation by a Liquid Droplet-Discharging Unit of a Liquid Column Resonance Type]

Next will be described a mechanism of liquid droplet formation by a liquid column resonance-based liquid droplet discharging unit 10 in the method of the present embodiment for producing fine particles.

First, description will be given to a principle of a liquid column resonance phenomenon generated in a liquid column resonance-generating liquid chamber 18 in the liquid column resonance-based liquid droplet discharging unit 10. When c denotes a sound velocity in a toner material liquid in the liquid column resonance-generating liquid chamber, f denotes a drive frequency applied from a vibration generating unit 20 to the toner material liquid as a medium, and λ denotes a wavelength at which resonance of the toner material liquid is generated, these c, f and λ satisfy the following Formula (1).

$$\lambda = c/f \qquad \text{Formula (1)}$$

In the liquid column resonance-generating liquid chamber 18 of FIG. 1, L denotes a length from an end portion of the frame at the fixed end side thereof to the other end portion at the side of a common liquid feeding path 17, h1 denotes a height of the end portion of the frame at the side of the common liquid feeding path 17 (h1 is, for example, 80 μm), and h2 denotes a height of a communication hole (h2 is, for example, 40 μm). In general, the height h1 is about twice the height h2.

Assuming that the end portion at the side of the common liquid feeding path 17 is equivalent to a fixed end in a closed state; i.e., in the case where both end portions are regarded as fixed ends, resonance is most efficiently formed when the length L is identical to an even multiple of ¼ the wavelength λ. That is, the length L is expressed by the following Formula (2).

$$L = (N/4)\lambda \qquad \text{Formula (2)}$$

where N denotes an even number.

The above Formula (2) is established when both ends of the liquid column resonance-generating liquid chamber 18 are free ends; i.e., both ends are completely open, and when both ends are equivalent to free ends.

Similarly, when one end is equivalent to a free end from which a pressure is escaped and the other end is closed (a fixed end); i.e., in the case where one end is a fixed or free end, resonance is most efficiently formed when the length L is identical to an odd multiple of ¼ the wavelength λ. That is, the length L is expressed by the above Formula (2) where N is an odd number.

Based on the above Formulas (1) and (2), the most efficient drive frequency f is calculated from the following Formula (3).

$$f = N \times c/(4L) \quad \text{Formula (3)}$$

where f denotes a drive frequency applied to the toner material liquid, L denotes a length of a liquid column resonance-generating liquid chamber in the longitudinal direction thereof, c denotes a sound velocity in a toner material liquid, and N is an integer, which is even when both ends are fixed ends or odd when one end is a fixed end.

In the method of the present embodiment for producing fine particles, it is preferred that a vibration having a frequency f obtained from the above Formula (3) be applied to the toner material liquid. Actually, a liquid has a viscosity attenuating resonance and thus a vibration is not amplified endlessly (Q factor is observed). However, as presented in the following Formulas (4) and (5), resonance is generated even at a frequency close to the most efficient drive frequency f obtained from Formula (3).

Figure 5A:
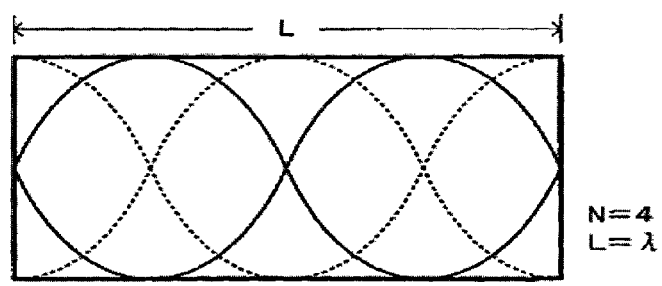
FIG. 5A is an explanatory, schematic view of standing waves representing changes in velocity and pressure when both ends of a liquid column resonance generating chamber are fixed ends and N is 4.
Figure 5B:
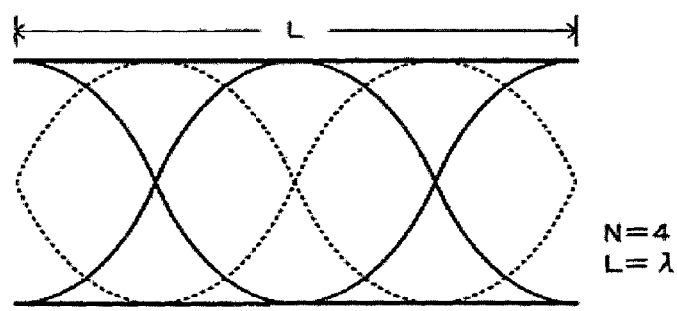
FIG. 5B is an explanatory, schematic view of standing waves representing changes in velocity and pressure when both ends of a liquid column resonance generating chamber are open ends and N is 4.
Figure 5C:
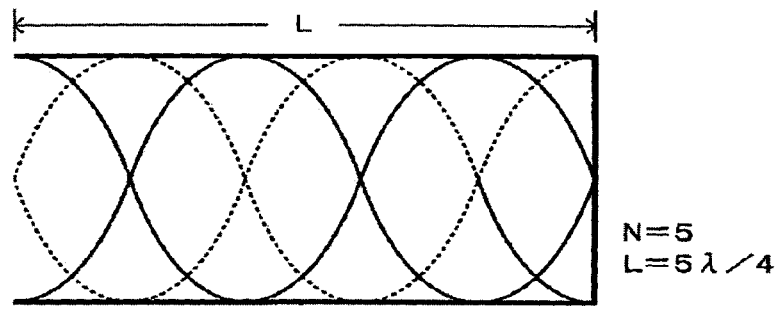
FIG. 5C is an explanatory, schematic view of standing waves representing changes in velocity and pressure when one end of a liquid column resonance generating chamber is a fixed end and N is 5.

FIGS. 4A to 4D each present shapes (resonance modes) of standing waves representing changes in velocity and pressure where N is 1, 2 or 3. FIGS. 5A to 5C each present shapes (resonance modes) of standing waves representing changes in velocity and pressure where N is 4 or 5. Actually, the sound wave is a compressional wave (longitudinal wave); however, it is generally expressed as transverse waves as presented in FIGS. 4A to 4D and 5A to 5C. In these figures, the solid line is a standing wave of velocity (distribution of velocity) and a dotted line is a standing wave of pressure (distribution of pressure).

In acoustics, an open end is an end at which the moving velocity of a medium (liquid) in the longitudinal direction is maximum while the pressure is zero. Meanwhile, a fixed end is defined as an end at which the moving velocity of a medium becomes zero. Such a closed end is considered as a hard wall in terms of acoustics and reflection of a wave occurs at the close end.

When each end is ideally completely closed or opened, standing waves through liquid column resonance are generated in the forms as shown in FIGS. 4A to 4D and 5A to 5C as a result of superposition of waves. Specifically, as can be seen from FIG. 4A for a case where one end is a fixed end and N=1, the amplitude of the distribution of velocity becomes zero at the fixed end while becomes maximum at the open end.

However, the standing wave varies in pattern depending on the number of discharge holes, the positions of discharge holes, and the cross-sectional shapes of discharge holes. Thus, in actual, a resonance frequency appears at a position shifted from a position obtained from the above Formula (3), but conditions for stable discharging can be established by appropriately adjusting the drive frequency. Note that, the conditions at the end portions are determined depending on, for example, the states of the openings of discharge holes and the states of the openings through which a liquid is supplied. Also, the standing wave is most efficiently generated with N being 1 to 5.

Specifically, the number of the discharge holes 19, the positions thereof, and the cross-sectional shapes thereof can also be factors to determine the drive frequency, and the drive frequency can be appropriately determined depending on them.

For example, assuming that the sound velocity c in a liquid is 1,200 m/s, the length L of the liquid column resonance-generating liquid chamber is 1.85 mm, wall surfaces are present at both sides of the liquid column resonance-generating liquid chamber (completely equivalent to the case where both ends are fixed ends), and a resonance mode is a mode of N=2, the most efficient resonance frequency is calculated as 324 kHz from the above Formula (3).

As another example, assuming that the sound velocity c in a liquid is 1,200 m/s, the length L of the liquid column resonance-generating liquid chamber is 1.85 mm, wall surfaces are present at both sides of the liquid column resonance-generating liquid chamber (completely equivalent to the case where both ends are fixed ends), and a resonance mode is a mode of N=4, the most efficient resonance frequency is calculated as 648 kHz from the above Formula (3). Even using a liquid column resonance-generating liquid chamber having the same configuration, a higher-order resonance can be utilized.

From the viewpoint of increasing frequency, preferably, both ends of the liquid column resonance-generating liquid chamber in the present embodiment are equivalent to fixed ends, or are end portions which can be explained as soft walls in terms of acoustics by influence of the openings of the discharge holes. However, at least one of both the ends may be a free end. Note that, the influence of the openings of the discharge holes means, for example, that the acoustic impedance becomes small and in particular the compliance components become large. The configuration illustrated in FIG. 4B or 5A where wall surfaces are formed at both ends of the longitudinal direction of the liquid column resonance-generating liquid chamber is preferred since it is possible to utilize a resonance mode that both ends are fixed ends as well as a resonance mode that one end is an open end with the discharge holes being regarded as openings.

The number of the discharge holes, the positions thereof, and the cross-sectional shapes thereof can also be factors to determine the drive frequency, and the drive frequency can be appropriately determined depending on them. For example, when the number of the discharge holes 19 is increased, the restriction of the fixed end of the liquid column resonance-generating chamber 18 is gradually loosened. As a result, a resonance standing wave almost the same as the resonance standing wave obtained at an open end occurs and the drive frequency increases. Also, when the cross-sectional shapes of the discharge holes 19 are round shapes and the volume of the discharge holes is changed depending on the thickness of the frame, the drive frequency in actual is changed. Furthermore, even at a frequency close to the drive frequency at which the resonance standing wave is most efficiently generated, a liquid column resonance standing wave is generated. That is, when the vibration generating unit is effected to vibrate using a drive waveform mainly containing a drive frequency f in a range determined by the following Formulas (4) and (5) on the basis of both lengths of L and Le, to thereby induce liquid column resonance to discharge liquid droplets from discharge holes. Here, L denotes a length between both ends of the liquid column resonance-generating liquid chamber in the longitudinal direction thereof and Le denotes a distance between an end portion of the liquid column resonance-generating liquid chamber at a side of the common liquid feeding path 17 and the discharge hole 19 closest to this end portion.

$$N \times c/(4L) \leq f \leq N \times c/(4Le) \quad \text{Formula (4)}$$

$$N \times c/(4L) \leq f \leq (N+1) \times c/(4Le) \quad \text{Formula (5)}$$

Preferably, a ratio Le/L of the length L of the liquid column resonance-generating liquid chamber in the longitudinal direction to the distance Le between the end portion of the liquid column resonance-generating liquid chamber at the side of the common liquid feeding path and the discharge hole closest to this end portion is greater than 0.6.

In this manner, in the liquid column resonance-generating liquid chamber, a standing wave is generated through liquid column resonance by a high frequency drive from a vibration generator. And, since the discharge holes 19 are arranged in the region corresponding to an antinode of the standing wave generated through liquid column resonance, which is a region where the pressure changes to the greatest extent, the liquid droplets 21 are continuously discharged from the discharge holes 19 according to the cycle of the antinode of the standing wave.

Referring to FIGS. 6A to 6D, next will be described the state of a liquid column resonance phenomenon generated in a liquid column resonance-generating chamber in a liquid droplet discharging head of the liquid column resonance-based liquid droplet discharging unit. Note that, in FIGS. 6A to 6D, the solid line written in the liquid column resonance-generating liquid chamber indicates a velocity distribution which is obtained by plotting a velocity measured at each of the measurement positions ranging from the fixed end side of the liquid column resonance-generating liquid chamber to the end portion at the side of the common liquid feeding path. And, the direction from the common liquid feeding path side toward the liquid column resonance-generating liquid chamber is defined as +(plus) and the reverse direction is defined as − (minus). In addition, in FIGS. 6A to 6D, the dotted line written in the liquid column resonance-generating liquid chamber indicates a pressure distribution which is obtained by plotting a pressure measured at each of the measurement positions ranging from the fixed end side of the liquid column resonance-generating liquid chamber to the end portion at the side of the common liquid feeding path. And, the positive pressure with respect to atmospheric pressure is defined as + (plus), and a negative pressure with respect to atmospheric pressure is defined as − (minus). When the pressure is a positive pressure, the pressure is applied downward in the figures, whereas when the pressure is a negative pressure, the pressure is applied upward in the figures. Furthermore, in FIGS. 6A to 6D, the liquid column resonance-generating liquid chamber is opened at the side of the common liquid feeding path as described above. However, when the height (h1 shown in FIG. 1) of the frame serving as the fixed end is preferably about twice or more the height (h2 shown in FIG. 1) of a communication hole through which the common liquid feeding path 17 is in communication with the liquid column resonance-generating liquid chamber 18, it is possible to approximate the liquid column resonance-generating liquid chamber 18 as having substantially fixed ends at both sides. Therefore, in FIGS. 6A to 6D, changes over time of the velocity distribution and the pressure distribution are shown under approximate conditions where both ends of the liquid column resonance-generating liquid chamber 18 are substantially fixed ends.

Figure 6A:
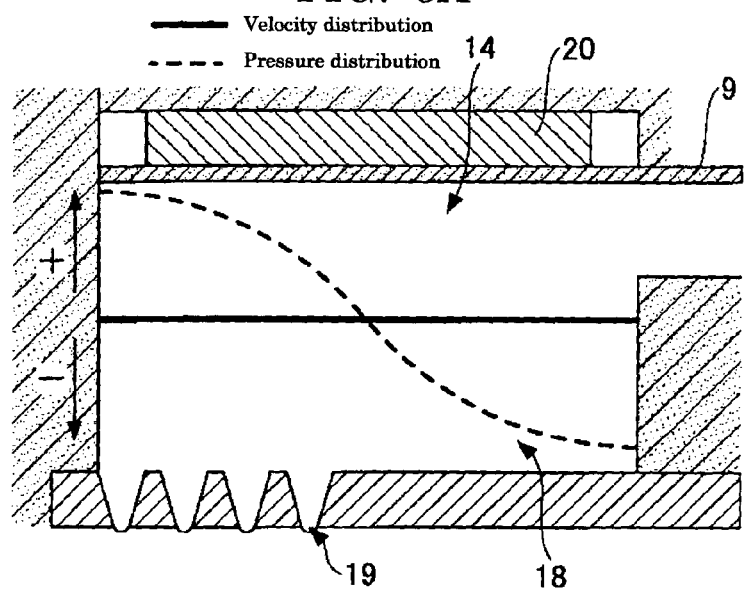
FIG. 6A is a schematic view of a state of a liquid column resonance phenomenon occurring in a liquid column resonance generating flow path in a liquid droplet discharging unit of a liquid column resonance type.
Figure 6B:
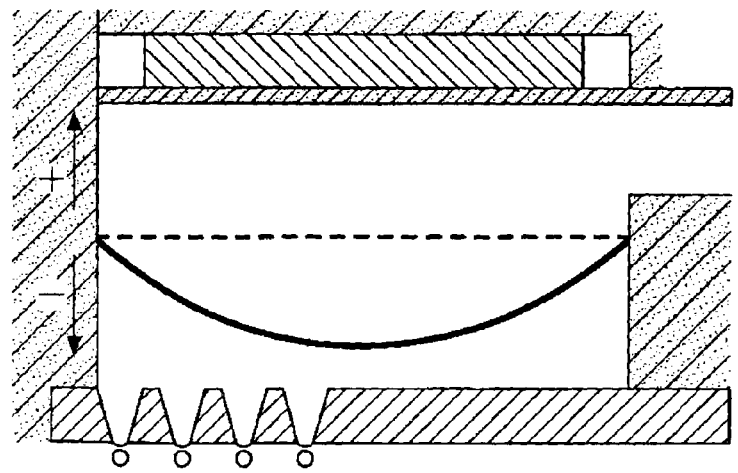
FIG. 6B is a schematic view of a state of a liquid column resonance phenomenon occurring in a liquid column resonance generating flow path in a liquid droplet discharging unit of a liquid column resonance type.

FIG. 6A shows a pressure waveform and a velocity waveform immediately before discharge of liquid droplets (and during discharge of liquid droplets and immediately after discharge of liquid droplets). The pressure in the liquid column resonance-generating liquid chamber 18 gradually increases in a region where the discharge holes 19 are provided. The pressure applied to meniscus, which decreases when the liquid is fed to the liquid column resonance-generating liquid chamber 18 for the previous discharge of liquid droplets, increases again. As shown in FIG. 6A, the pressure in the liquid column resonance-generating liquid chamber 18 is maximum in the vicinity of a region where the discharge holes 19 are provided. Thereafter, as shown in FIG. 6B, the positive pressure in the vicinity of the discharge holes 19 decreases and transfers toward the negative pressure while the liquid droplets 21 are being discharged.

Figure 6C:
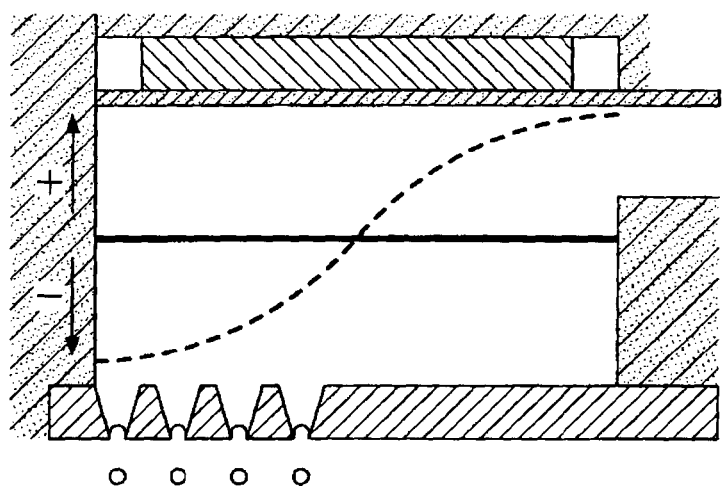
FIG. 6C is a schematic view of a state of a liquid column resonance phenomenon occurring in a liquid column resonance generating flow path in a liquid droplet discharging unit of a liquid column resonance type.
Figure 6D:
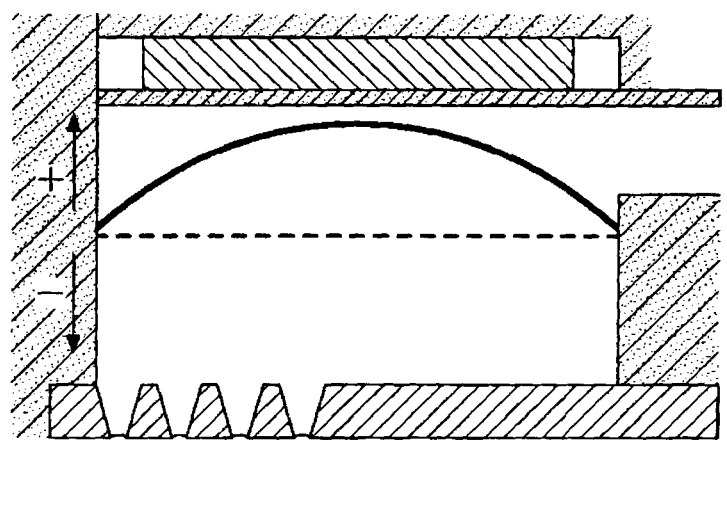
FIG. 6D is a schematic view of a state of a liquid column resonance phenomenon occurring in a liquid column resonance generating flow path in a liquid droplet discharging unit of a liquid column resonance type.

Furthermore, as shown in FIG. 6C, the pressure in the vicinity of the discharge holes 19 becomes minimum. From this point of time, the liquid column resonance-generating liquid chamber 18 starts to be filled with the toner material liquid 14. Thereafter, as shown in FIG. 6D, the negative pressure in the vicinity of the discharge holes 19 becomes small and transfers toward the positive pressure. At this point of time, the filling of the toner material liquid 14 has finished. Then, as shown in FIG. 6A, the positive pressure in the liquid droplet discharge area in the liquid column resonance-generating liquid chamber 18 becomes maximum, and the liquid droplets 21 are discharged from the discharge holes 19.

In this manner, in the liquid column resonance-generating liquid chamber, a standing wave is generated through liquid column resonance by a high frequency drive from a vibration generator. And, since the discharge holes 19 are arranged in a region where the pressure changes to the greatest extent (i.e., a region corresponding to an antinode of the standing wave generated through liquid column resonance), the liquid droplets 21 are continuously discharged from the discharge holes 19 according to the cycle of the antinode of the standing wave.

Next will be described one example of a configuration where liquid droplets are discharged through liquid column resonance phenomenon. This example is a case where in FIG. 1, the length L is 1.85 mm and a resonance mode is N=2, and first to fourth discharge holes are arranged at positions corresponding to an antinode of a pressure standing wave based on the resonance mode of N=2. Also, the drive frequency is a sine wave at 340 kHz.

Figure 7:
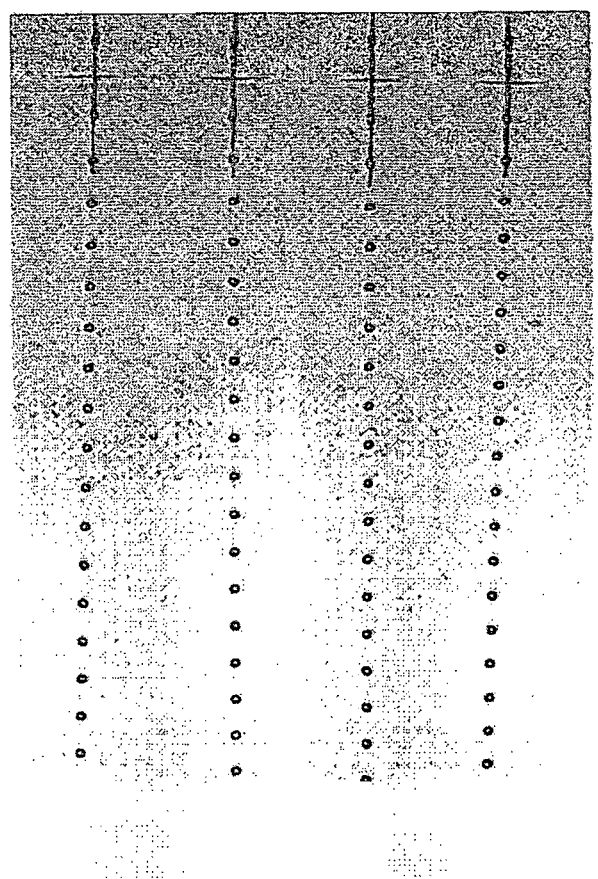
FIG. 7 depicts a state where liquid droplets are discharged in a liquid droplet discharging unit of a liquid column resonance type.
Figure 8:
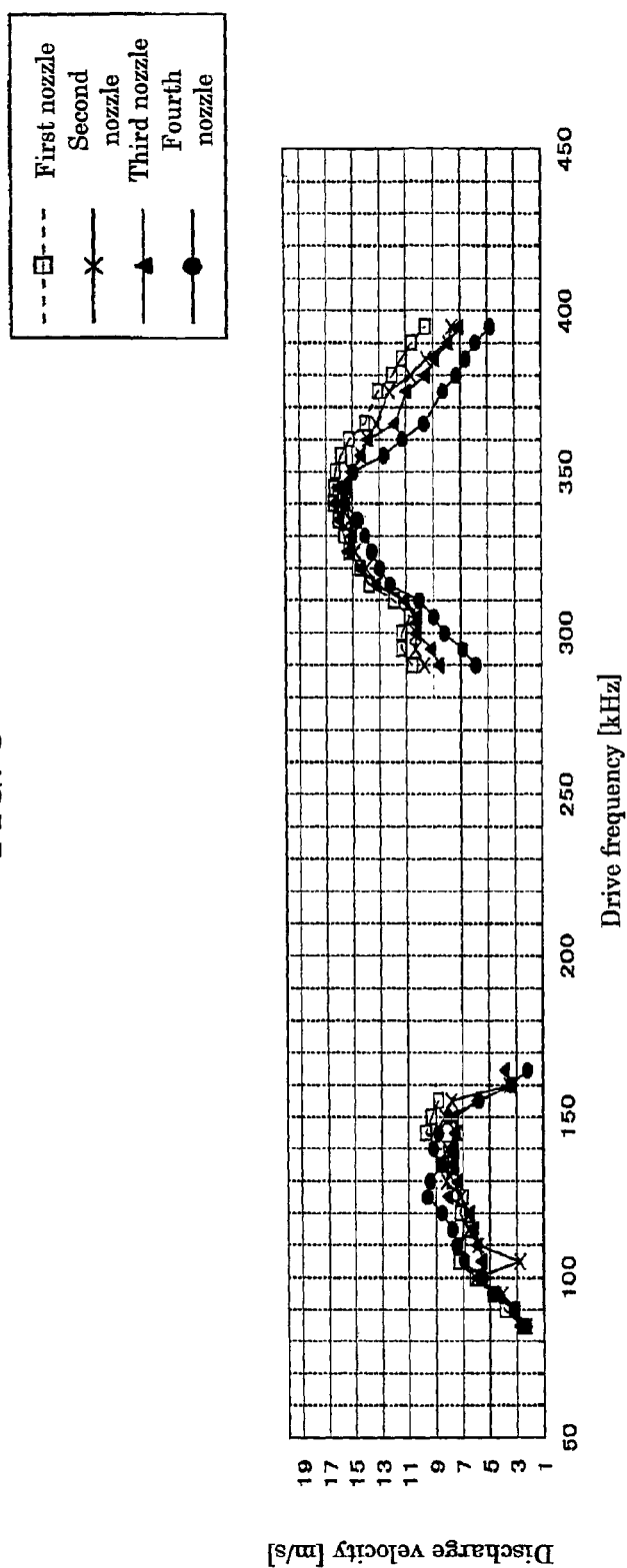
FIG. 8 is a characteristic diagram representing a relationship between drive frequency and discharge velocity of liquid droplets.

FIG. 7 is for explaining one example of the state where liquid droplets are being discharged by the liquid droplet discharging unit of a liquid column resonance type, and is a photograph of the state where liquid droplets are being discharged from each of the discharge holes, which is taken by laser shadowgraphy. As can be seen from FIG. 7, discharge of liquid droplets with extremely uniform in diameter and substantially uniform velocity is achieved. FIG. 8 is a characteristic graph illustrating characteristics between drive frequency and liquid droplet discharge velocity, when driving is performed with a sine wave having the same amplitude in a range of 290 kHz to 395 kHz as a drive frequency. As can be seen from FIG. 8, the discharge velocity of liquid droplets from each of the first to fourth discharge holes is uniform in the vicinity of a drive frequency of 340 kHz and the maximum discharge velocity is achieved. From this characteristic result, it is understood that uniform discharge is realized at a position corresponding to an antinode of the liquid column resonance standing wave with a drive frequency of 340 kHz, which is a second mode of liquid column resonance frequency. In addition, from the characteristic result in FIG. 8, it is understood that liquid droplets are not discharged during a period between a first mode in the vicinity of 130 kHz and a second mode in the vicinity of 340 kHz. This results from frequency characteristics of liquid column resonance standing waves characteristic of liquid column resonance.

[Coalescence Preventing Unit Using Gas Flow]

Next will be described a unit configured to prevent coalescence between the discharged liquid droplets.

Figure 9:
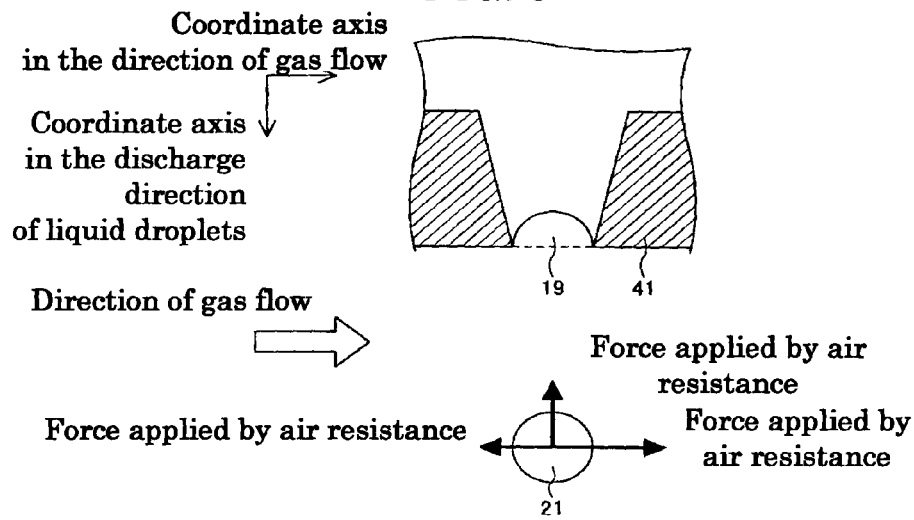
FIG. 9 is a schematic view for explaining a principle for which liquid droplets discharged at a certain velocity by a liquid droplet discharging unit change their orbits by receiving influences of gas flow in a system.
Figure 10A:
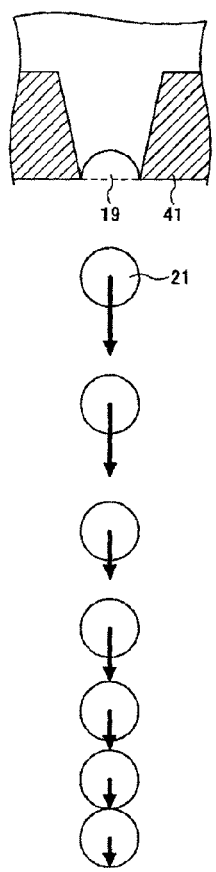
FIG. 10A is an explanatory, schematic view of one exemplary trajectory of a liquid droplet discharged by a liquid droplet discharging unit.
Figure 10B:
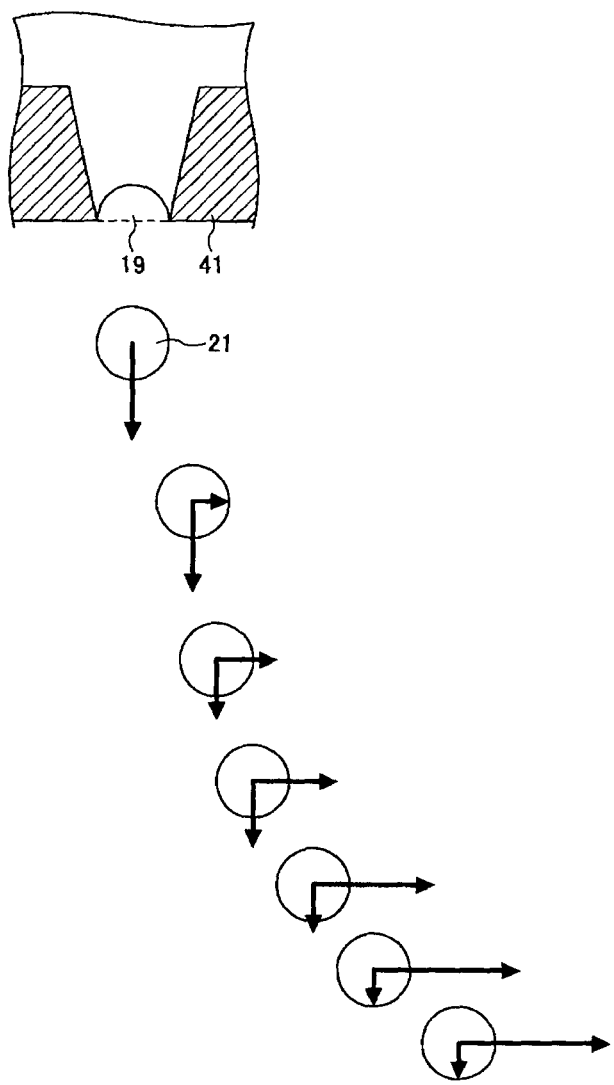
FIG. 10B is an explanatory, schematic view of one exemplary trajectory of a liquid droplet discharged by a liquid droplet discharging unit.

FIG. 9 is a schematic view for explaining a principle for which liquid droplets discharged at a certain velocity by the above-described liquid droplet discharging unit change their orbits by receive influences of gas flow in a system. FIGS. 10A and 10B are schematic views for explaining exemplary trajectories of liquid droplets discharged by the liquid droplet discharging unit. FIG. 10A is one exemplary trajectory of a liquid droplet discharged in a system without gas flow. FIG. 10B is one exemplary trajectory of a liquid droplet discharged in a system with gas flow.

As illustrated in FIG. 9, liquid is discharged from the discharge hole by the above-described liquid droplet discharging unit. The discharged liquid is formed into liquid droplets by the action of surface tension. The liquid droplets are discharged at a certain initial velocity as a result of being increased in pressure of the liquid column resonance-generating liquid chamber. The direction in which the liquid droplets are discharged is substantially perpendicular to the opening surface of the discharge hole.

When liquid droplets are discharged in a system without gas flow, the liquid droplets receive force expressed by the following Formula (6) known as the Stokes' law and decrease in velocity.

$$\frac{\partial \rho c \vec{V}}{\partial t} = -6\pi\mu r \vec{V} \qquad \text{Formula (6)}$$

Therefore, the discharge liquid droplets decrease in velocity in accordance with the Stokes' law, and continuously discharged liquid droplets each draw the trajectory presented by FIG. 10A. Note that, each of the arrows in FIG. 10A means the scalar of each velocity vector in the discharge direction of the liquid droplet.

As has been known, the attenuation rate of the velocity of liquid droplets depends on the distance between the adjacent liquid droplets (see, for example, the Faxen's law). This is said to result from turbulence of the gas flow due to the presence of liquid droplets.

As illustrated in FIG. 10B, in the present embodiment, gas flow is supplied in a direction substantially perpendicular to the discharge direction of liquid droplets. In this case, the trajectory of the liquid droplet is curved in a lateral direction in FIG. 10B. The force to curve the trajectory of the liquid droplet is proportional to the liner velocity U of gas flow as presented in the following Formula (7). Note that, each of the arrows in FIG. 10B means the scalar of each velocity vector at coordinates along the discharge direction of the liquid droplet and the direction perpendicular to the discharge direction thereof.

$$\frac{\partial \rho c \vec{V}}{\partial t} = -6\pi\mu r\left(\vec{V} - \vec{U}\right) \qquad \text{Formula (7)}$$

As is clear from FIG. 10B, the velocity in the downward vertical direction in FIG. 10B gradually decreases in accordance with the Stokes' law. However, the liquid droplets are accelerated by the force derived from the gas flow in a rightward horizontal direction in FIG. 10B. Finally, the direction of the trajectory of the particle becomes the same as that of the gas flow.

Figure 11A:
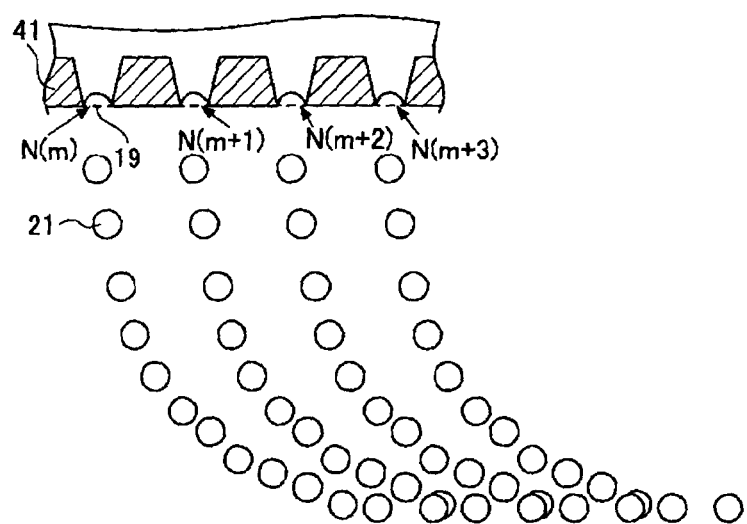
FIG. 11A is an explanatory, schematic view of another exemplary trajectory of liquid droplets discharged by a liquid droplet discharging unit.
Figure 11B:
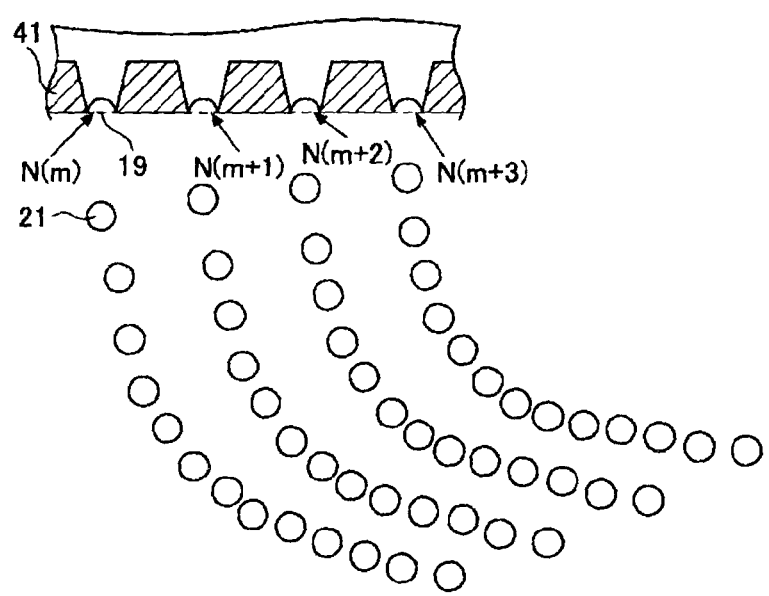
FIG. 11B is an explanatory, schematic view of another exemplary trajectory of liquid droplets discharged by a liquid droplet discharging unit.

FIGS. 11A and 11B each are a schematic view for explaining another exemplary trajectory of liquid droplets discharged by the liquid droplet discharging unit. A plurality of discharge holes are provided in FIGS. 11A and 11B. FIG. 11A illustrate exemplary trajectories drawn when the initial velocity of all the liquid droplets discharged from the discharge holes is the same. FIG. 11B illustrates exemplary trajectories drawn when the initial velocity of the liquid droplets discharged from the discharge holes is different between an upstream side and a downstream side of the gas flow in the flowing direction.

In FIG. 11A, discharge holes N(m), N(m+1), N(m+2) and N(m+3) are arranged from the upstream side to the downstream side of the gas flow in the flowing direction thereof, and liquid droplets having the same mass are discharged from each discharge hole at the same initial velocity. As is clear from FIG. 11A, the trajectories of the liquid droplets discharged from each discharge hole are substantially matched with each other in the vertical direction to form a region where the distribution density of the liquid droplets is high, so that coalescence of particles may be accelerated.

As illustrated in FIG. 11B, in the present embodiment, liquid droplets are discharged at difference initial velocities from every discharge hole. Thus, finally converged trajectories of the liquid droplets become different to suppress an increase in the spatial distribution density of the liquid droplets. As a result, even when the number of discharge holes are larger than the case of FIG. 11B, it is possible to avoid coalescence between the liquid droplets.

One method for discharging liquid droplets at different initial velocities a plurality of discharge holes in the liquid column resonance-generating liquid chamber 18 is a method where the discharge holes are formed so as to have different diameters. In general, the larger the diameter of the discharge holes (e.g., the diameter of the discharge hole when it is circular) is, the smaller the initial velocity of the discharge liquid droplets is. Another method therefor is a method where the discharge holes are located at different intervals in the longitudinal direction of the liquid column resonance-generating liquid chamber (or at different pitches between the adjacent discharge holes). As is clear from FIGS. 4A to 4D, the pressure distribution of a standing wave generated is varied in the longitudinal direction of the liquid column resonance-generating liquid chamber. Therefore, by selecting the positions of the discharge holes arranged, it is possible to discharge liquid droplets at different initial velocities.

The initial velocity of the liquid droplets discharged from the discharge hole located at the upstream side of the gas flow in the flowing direction thereof is higher than the initial velocity of the liquid droplets discharged from the discharge hole located at the downstream side of the gas flow in the flowing direction thereof. Regarding at least one of adjacent pairs of the discharge holes, their opening diameters and positions are preferably selected such that the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$. Furthermore, regarding each of the adjacent pairs of the discharge holes, their opening diameters and positions are preferably selected such that the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$. Moreover, preferably, the discharge hole located at the downstream side of the gas flow in the flowing direction thereof has an opening diameter $D_1$ and the discharge hole located at the upstream side of the gas flow in the flowing direction thereof has an opening diameter $D_2$, where the opening diameter $D_1$ is equal to or greater than $1.1 \times D_2$.

As discussed above, those skilled in the art can appropriately select the opening diameters and positions of the discharge holes to make the initial velocities of the liquid droplets different from each other. As a result, it is possible to avoid coalescence between the discharged liquid droplets.

Note that, the initial velocity of the liquid droplets is lower than the velocity of the gas flow in a horizontal direction.

[Liquid Droplet Solidifying Unit]

Next will be described a unit configured to solidify liquid droplets discharged from the above-described liquid droplet discharging unit.

Although solidification properties of the toner material liquid depend on properties of the toner material liquid, any unit can be used so long as it can form the toner material liquid into a solid state. For example, when the toner material liquid is a liquid containing solid raw materials dissolved and/or dispersed in a volatile solvent, liquid droplets discharged are dried in conveyance gas flow; i.e., the liquid droplets can be solidified by volatilizing the solvent.

Evaporation of the solvent can be performed to any extent for those skilled in the art to determine, for example, the temperature, vapor pressure and kind of sprayed gas. It is not necessary to completely dry the toner material liquid. So long as fine particles collected by the below-described collecting unit keep a solid state, the fine particles may be further dried in an additional step after collection. Alternatively, liquid droplets may be solidified by utilizing, for example, change in temperature and chemical reaction.

[Solid Particle (Fine Particle) Collecting Unit]

Next will be described a unit configured to collect solidified fine particles of the liquid droplets of the toner material liquid discharged from the above-described liquid droplet discharging unit.

The solidified fine particles can be collected by, for example, a known powder collecting unit such as a cyclone collecting device and a bag filter.

Figure 12:
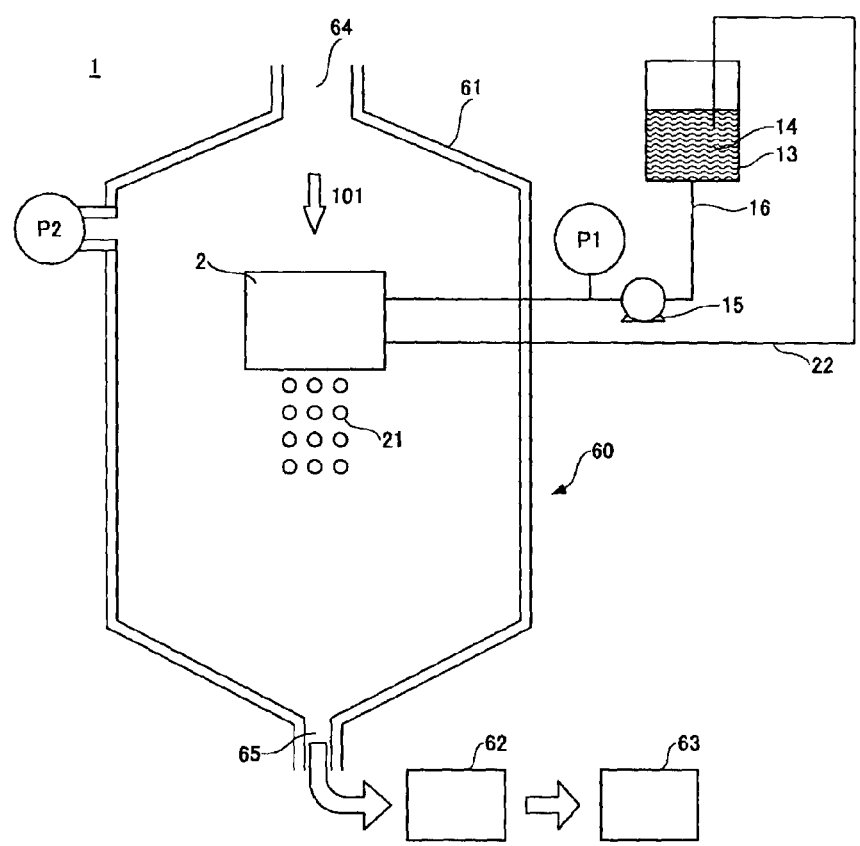
FIG. 12 is a cross-sectional view of one example of an apparatus for producing fine particles, which can perform a method of the present embodiment for producing fine particles.
Figure 13:
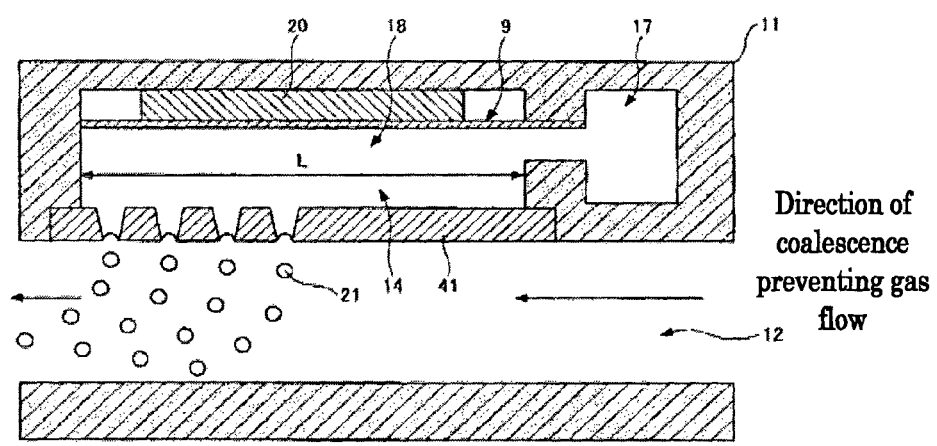
FIG. 13 is an explanatory, schematic view of another example of a liquid droplet discharging method of the present embodiment.

FIG. 12 is a cross-sectional view of one example of an apparatus for producing fine particles, which performs the method of the present embodiment for producing fine particles. A fine particle producing apparatus 1 is composed mainly of a liquid droplet discharging unit 2 and a drying and collecting unit 60. The liquid droplet discharging unit 2 may be the above-described liquid column resonance-based liquid droplet discharging unit.

A raw material container 13 and a liquid circulating pump 15 are connected to the liquid droplet discharging unit 2. The raw material container 13 houses a toner material liquid 14. The liquid circulating pump 15 feeds the toner material liquid 14 in the raw material container 13 to the liquid droplet discharging unit 2 via a liquid feeding tube 16. The liquid circulating pump 15 pressure-feeds the toner material liquid 14 in the liquid feeding tube 16 in order to return the toner material liquid 14 via a liquid returning tube 22 to the raw material container 13. With this configuration, the toner material liquid 14 can be fed constantly to the liquid droplet discharging unit 2.

The liquid feeding tube 16 is provided with a pressure meter P1 and the drying and collecting unit 60 is provided with a pressure meter P2. The pressure meters P1 and P2 are used to manage the pressure for feeding the toner material liquid to the liquid droplet discharging unit 2 and the pressure of the interior of the drying and collecting unit 60. When P1>P2, the toner material liquid 14 may leak from the discharge holes. Whereas when P1<P2, gas enters the discharge unit so that discharge may stop. Preferably, P1 is nearly equal to P2.

The drying and collecting unit 60 illustrated in FIG. 12 contains a chamber 61, a fine particle collecting unit 62 and a toner reservoir 63. In the chamber 61, a conveyance gas flow 101 is supplied from a conveyance gas flow inlet 64. Liquid droplets 21 discharged from the liquid droplet discharging unit 2 are conveyed by the action of gravity and the conveyance gas flow 101 in a downward vertical direction, for example.

[Conveyance Gas Flow]

Forming the above-described conveyance gas flow in the fine particle producing apparatus can prevent the discharged liquid droplets 21 from slowing down due to air resistance. As a result, it is possible to prevent the liquid droplets 21 from increasing their particle diameters due to coalescence between the continuously discharged liquid droplets 21 which results from the following phenomenon: the discharged liquid droplets 21 slow down by the action of air resistance before drying and coalesce with the previously discharged liquid droplets 21.

In FIG. 12, the liquid droplet discharging unit 2 discharges the liquid droplets 21 in a downward vertical direction, but the angle at which the liquid droplets are discharged can appropriately be selected. For example, as illustrated in FIG. 13 which is a schematic view for explaining another example of a liquid droplet discharging method of the present embodiment, a conveyance gas flow may be supplied in a perpendicular direction to the discharge direction, i.e., in a horizontal direction in FIG. 13. In addition, the angle between the discharge direction and the direction of the conveyance gas flow is not limited to the examples of FIGS. 12 and 13, and other angles may be set. It is preferable to determine the discharge direction and the direction of the conveyance gas flow so that the liquid droplets become farther from the liquid droplet discharging unit.

Note that, when the liquid droplets are conveyed from the discharge holes, the conveyance gas flow is preferably supplied in such a direction that the trajectories of the liquid droplets are not overlapped each other.

In one alternative configuration, coalescence between liquid droplets is prevented by the above-described conveyance gas flow (hereinafter referred to as a first conveyance gas flow) and then solidified particles are conveyed by a second conveyance gas flow to the above-described solid particle collecting unit.

The velocity of the first conveyance gas flow is preferably equal to or greater than the discharge velocity of the liquid droplets. When the velocity of the first conveyance gas flow is smaller than the discharge velocity of the liquid droplets, the first conveyance gas flow may not sufficiently exhibit an effect of preventing coalescence between liquid droplets.

Note that, the conveyance gas flow may contain a chemical substance for accelerating solidification of liquid droplets.

A unit configured to generate the conveyance gas flow may be based on, for example, a method of pressurizing using a blower provided at the conveyance gas flow inlet 64 in the upper portion of the chamber 61, or a method of aspirating from a conveyance gas flow outlet 65. The fine particle collecting unit 62 may be a known collecting device such as a cyclone collecting device and a bag filter.

The state of the conveyance gas flow 101 is not particularly limited so long as it can prevent coalescence between the liquid droplets 21, and may be appropriately selected from laminar flow, swirl flow and turbulent flow. The kind of the gas of the conveyance gas flow 101 is not particularly limited, and may be air or inert gases such as nitrogen. As described above, since the liquid droplets 21 dried result to be free from coalescence therebetween, it is preferable to employ conditions to accelerate drying of the liquid droplets 21. That is, the conveyance gas flow 101 is preferably free of vapor gas of the solvent contained in the toner material liquid 14. The temperature of the conveyance gas flow 101 can appropriately be adjusted by those skilled in the art, and preferably does not change during production. Also, a unit configured to change the flowing state of the conveyance gas flow 101 may be provided in the chamber 61. The conveyance gas flow 101 can prevent not only coalescence between the liquid droplets 21 but also deposition of the liquid droplets 21 on the chamber 61.

[Secondary Drying]

When the amount of the residual solvent is large relative to the fine particles collected by the solid particle collecting unit, secondary drying is performed for reducing the residual solvent, if necessary. The secondary drying can be performed using a generally known drying unit such as a fluidized-bed drying device or a vacuum drying device. When the organic solvent remains in the fine particles (toner), properties of the toner such as heat resistance storage stability, fixability and chageability change over time. In addition, the organic solvent is volatilized by heating upon fixing, and is highly likely to adversely affect users of apparatus and peripheral devices. Therefore, it is preferable to reduce the residual solvent in the toner.

[Toner Material Liquid]

Description will be given to materials of a toner material liquid and a preparation method of the toner material liquid when a toner is produced by the method of the present embodiment for producing fine particles. Note that, the below-listed materials of the toner material liquid are exemplary ones, and the same materials as materials of conventional electrophotographic toners can be used.

The method of the present embodiment for producing fine particles may use liquids containing the following toner materials melted: a colorant, a releasing agent, a binder resin and other materials. Also, the method of the present embodiment for producing fine particles may use liquids containing the following resin dissolved or dispersed in various organic solvents, or liquids containing the following resin melted.

<<Binder Resin>>

The binder resin for a toner produced by the method of the present embodiment for producing fine particles is not particularly limited. Examples thereof include: vinyl polymers of, for example, styrene monomers, acrylic monomers or methacrylic monomers; copolymers of two or more kinds of these monomers; polyester resins; polyol resins; phenol resins; polyurethane resins; polyamide resins; epoxy resins; xylene resins; terpene resins; coumarone-indene resins; polycarbonate resins; and petroleum resins.

The properties of the binder resin are not particularly limited, but the binder resin preferably dissolves in the below-described solvents.

When the binder resin is measured for molecular weight through gel permeation chromatography (GPC) using tetrahydrofuran as a solvent, the distribution of the molecular weight of the THF soluble matter of the resin component preferably has at least one peak in a molecular weight range of 3,000 to 50,000 (on the number average molecular weight basis) since the formed toner has desired fixing property and offset resistance. Also, preferably used is a binder resin where the resin components having a molecular weight of 100,000 or lower are 60% to 100%. More preferably used is a binder resin having at least one peak in a molecular weight range of 5,000 to 20,000.

The toner preferably contains a resin having an acid value of 0.1 mgKOH/g to 50 mgKOH/g in an amount of 60% by mass or higher. Note that, the acid value of the resin referred to herein is measured by the method according to JIS K-0070.

<<Magnetic Material>>

Examples of a magnetic material usable in the present embodiment include: magnetic iron oxides (e.g., magnetite, maghemite and ferrite) and iron oxides containing other metal oxides; metals such as iron, cobalt and nickel, and alloys formed between these metals and other metals such as aluminum, cobalt, copper, lead, magnesium, tin, zinc, antimony, beryllium, bismuth, cadmium, calcium, manganese, selenium, titanium, tungsten and/or vanadium; and mixtures thereof. The magnetic material may be used as a colorant also.

The amount of the magnetic material used is preferably 10 parts by mass to 200 parts by mass, more preferably 20 parts by mass to 150 parts by mass, relative to 100 parts by mass of the binder resin. The number average particle diameter of the magnetic material is preferably 0.1 µm to 2 µm, more preferably 0.1 µm to 0.5 µm. The number average particle diameter of the magnetic material can be measured in the following manner, for example. Specifically, a magnified photograph of the magnetic material is taken by a transmission electron microscope, and the magnified photograph is used to measure the number average particle diameter of the magnetic material using, for example, a digitizer.

<<Colorant>>

The colorant is not particularly limited. Examples thereof include carbon black, nigrosine dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazinelake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro anilin red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red FSR, brilliant carmin 6B, pigment scarlet 3B, bordeaux 5B, toluidine Maroon, permanent bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanin blue, phthalocyanin blue, fast sky blue, indanthrene blue (RS and BC), indigo, ultramarine, iron blue, anthraquinon blue, fast violet B, methylviolet lake, cobalt purple, manganese violet, dioxane violet, anthraquinon violet, chrome green, zinc green, chromium oxide, viridian, emerald green, pigment green B, naphthol green B, green gold, acid green lake, malachite green lake, phthalocyanine green, anthraquinon green, titanium oxide, zinc flower, lithopone, and mixtures thereof.

The amount of the colorant is preferably 1% by mass to 15% by mass, preferably 3% by mass to 10% by mass, relative to the amount of the toner.

The colorant may be mixed with a resin to form a masterbatch. The masterbatch is used for dispersing the colorant in advance. Thus, if the colorant is sufficiently dispersed, it is not necessary to use the colorant in the form of the masterbatch.

Examples of the binder resin which is to be kneaded together include: polyester resins; styrene polymers and substituted products thereof (e.g., polystyrenes, poly-p-chlorostyrenes and polyvinyltoluenes); styrene copolymers (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers); polymethyl methacrylates; polybutyl methacrylates; polyvinyl chlorides; polyvinyl acetates; polyethylenes; polypropylenes; polyesters; epoxy resins; epoxy polyol resins; polyurethanes; polyamides; polyvinyl butyrals; polyacrylic acid resins; rosin; modified rosin; terpene resins; aliphatic or alicyclic hydrocarbon resins; aromatic petroleum resins; chlorinated paraffins; and paraffin waxes. These may be used alone or in combination.

The masterbatch can be prepared by mixing/kneading the colorant with the resin for use in a masterbatch through application of high shearing force.

The amount of the masterbatch used is preferably 0.1 parts by mass to 20 parts by mass per 100 parts by mass of the binder resin.

In the production of the masterbatch, a dispersing agent may be used for improving dispersibility of the colorant. The dispersing agent used for dispersing the colorant preferably has higher compatibility with the binder resin. Specific examples of commercially available products thereof include AJISPER PB821, AJISPER PB822 (these products are of Ajinomoto Fine-Techno Co., Ltd.), Disperbyk-2001 (product of BYK-chemie Japan, Co., Ltd.) and EFKA-4010 (product of EFKA Co., Ltd.).

The dispersing agent is preferably incorporated into the toner in an amount of 0.1% by mass to 10% by mass relative to the amount of the colorant. When the amount of the dispersing agent incorporated thereinto is less than 0.1% by mass, the colorant may be insufficiently dispersed. Whereas when it is more than 10% by mass, the formed toner may be degraded in chargeability under high-humidity conditions.

<<Releasing Agent (Wax)>>

The toner of the present embodiment preferably contains a releasing agent. The releasing agent enables the toner to avoid offset upon fixing.

The releasing agent is not particularly limited. Examples thereof include aliphatic hydrocarbon waxes (e.g., low-molecular-weight polyethylenes, low-molecular-weight polypropylenes, polyolefin waxes, microcrystalline waxes, paraffin waxes and SAZOLE wax), oxides of aliphatic hydrocarbon waxes (e.g., oxidized polyethylene waxes) and block copolymers thereof, vegetable waxes (e.g., candelilla wax, carnauba wax, Japan wax and jojoba wax), animal waxes (e.g., bees wax, lanolin and spermaceti wax), mineral waxes (e.g., ozokerite, ceresin and petrolatum), waxes containing fatty acid esters as a main component (e.g., montanic acid ester wax and castor wax) and waxes formed by deoxidizing a part or the whole of a fatty acid ester (e.g., deoxidized carnauba wax).

The releasing agent preferably has a melting point of 70° C. to 140° C., more preferably 70° C. to 120° C., from the viewpoint of attaining both desired blocking resistance and offset resistance. When the melting point of the releasing agent is lower than 70° C., the formed toner may be degraded in blocking resistance. Whereas when it is higher than 140° C., the formed toner may hardly exhibit its offset resistance.

The amount of the releasing agent is preferably 0.2 parts by mass to 20 parts by mass, more preferably 0.5 parts by mass to 10 parts by mass, per 100 parts by mass of the binder resin.

Note that, the melting point of the releasing agent in the present embodiment is defined as the peak top temperature of the maximum endothermic peak of the releasing agent as measured through DSC (differential scanning calorimetry).

The measurement of the releasing agent through DSC can be performed using a differential scanning calorimeter of inner-heat input compensation type according to ASTM D3418-82. A DSC curve usable in the present invention is obtained as follows: the temperature of a releasing agent is once raised and then decreased to record its pre-history; and the temperature of the releasing agent is raised at a temperature increasing rate of 10° C./min.

<<Other Materials>>

The toner of the present embodiment (and toner base particles) may contain other materials.

The other materials are used for the purposes of, for example, protecting the electrostatic image bearing member/carrier, increasing cleanability and fixability, and adjusting thermal/electrical/physical characteristics, resistance and softening point. Examples of the other materials include various metal soaps, fluorine-containing surfactants, dioctyl phthalate, tin oxide, zinc oxide, carbon black, antimony oxide (serving as an electroconductivity-imparting agent), and inorganic fine powder (e.g., titanium oxide, aluminum oxide and alumina).

The inorganic fine powder may be hydrophobidized, if desired. Further examples include lubricants (e.g., polytetrafluoroethylene, zinc stearate and polyvinylidene fluoride), polishers (e.g., cesium oxide, silicon carbide and strontium titanate) and anti-caking agents. Furthermore, a small amount of white or black fine particles having an opposite polarity to the toner particles are preferably used as a developability-improving agent.

In order to control the charging amount or other properties, these additives are preferably treated with a treating agent such as silicone varnish, various modified silicone varnishes, silicone oil, various modified silicone oils, a silane coupling agent, a functional group-containing silane coupling agent, or organic silicon compounds.

The additive preferably used is inorganic fine powder. Examples of the inorganic fine powder include silica, alumina and titanium oxide.

Further examples of other external additives include polymer fine particles such as polystyrenes, methacrylic acid esters and acrylic acid ester copolymers (which are obtained through soap-free emulsification polymerization, suspension polymerization, or dispersion polymerization) and polymer particles obtained from a polycondensate resin and a thermosetting resin (e.g., silicone, benzoguanamine and Nylon).

Such external additives may be treated with a surface-treating agent to increase their hydrophobicity, and may be prevented from degradation even under high-humidity conditions. Preferred examples of the surface-treating agent include silane coupling agents, silylating agents, fluorinated alkyl group-containing silane coupling agents, organic titanate-based coupling agents, aluminum-based coupling agents, silicone oil and modified silicone oil.

The external additive preferably has a primary particle diameter of 5 nm to 2 μm, more preferably 5 nm to 500 nm. Also, the inorganic fine particles preferably have a specific surface area of 20 $m^2/g$ to 500 $m^2/g$, as measured by the BET method.

The amount of the external additive is preferably 0.01% by mass to 5% by mass, more preferably 0.01% by mass to 2% by mass, relative to the amount of the toner.

A cleanability improver may be added to the toner. The cleanability improver is for removing the developer remaining after transfer on the electrostatic image bearing member and/or primary transfer medium. Examples thereof include fatty acid metal salts (e.g., zinc stearate, calcium stearate and stearic acid) and polymer fine particles produced through soap-free emulsification polymerization (e.g., polymethyl methacrylate fine particles and polystyrene fine particles). Preferably, the polymer particles have a relatively narrow particle size distribution and a volume average particle diameter of 0.01 μm to 1 μm.

EXAMPLES

The present invention will next be described by way of Examples, which should not be construed as limiting the present invention thereto.
[Preparation of a Colorant Dispersion Liquid]

Carbon black was selected as a colorant and a dispersion liquid of the colorant (a colorant dispersion liquid) was prepared.

Carbon black (REGAL 400, product of Cabot Co., Ltd.) (17 parts by mass) and a colorant dispersing agent (3 parts by mass) were primarily dispersed in ethyl acetate (80 parts by mass) using a mixer having a stirring blade. The colorant dispersing agent used was AJISPER PB821 (product of Ajinomoto Fine Techno Co., Ltd.).

The obtained primarily dispersed liquid was more finely dispersed using a beads mill (model LMZ, product of Ashizawa Finetech Ltd., the diameter of zirconia beads: 0.3 mm). Subsequently, aggregates having a particle diameter of 5 μm or greater were completely removed from the resultant dispersion liquid, to thereby prepare a secondarily dispersed liquid as the colorant dispersion liquid.
[Preparation of a Releasing Agent Dispersion Liquid]

Next, a dispersion liquid of a releasing agent (a releasing agent dispersion liquid) was prepared.

Carnauba wax (18 parts by mass) and a wax dispersing agent (2 parts by mass) were primarily dispersed in ethyl acetate (80 parts by mass) using a mixer having a stirring blade. The wax dispersing agent used was one where a styrene-butyl acrylate copolymer was grafted to polyethylene wax.

While being stirred, the obtained primarily dispersed liquid was heated to 80° C. to dissolve carnauba wax. Then, the liquid temperature of the resultant liquid was decreased to room temperature to precipitate wax particles so that the maximum particle diameter thereof was 3 μm or less. The obtained dispersed liquid was more finely dispersed using a beads mill (model LMZ, product of Ashizawa Finetech Ltd., the diameter of zirconia beads: 0.3 mm) so that the maximum particle diameter thereof was 1 μm or less, to thereby prepare the releasing agent dispersion liquid.
[Preparation of a Toner Material Liquid]

Next, a toner material liquid containing a binder resin, the colorant dispersion liquid and the releasing agent dispersion liquid was prepared.

Specifically, a polyester resin (serving as the binder resin) (100 parts by mass), the colorant dispersion liquid (30 parts by mass) and the releasing agent dispersion liquid (30 parts by mass) were stirred in ethyl acetate (840 parts by mass) for 10 min using a mixer having a stirring blade, so that they were homogeneously dispersed therein. No aggregates were formed from the colorant or wax particles due to shock of dilution with the solvent.
[Apparatus for Producing Fine Particles]

An apparatus for producing fine particles used was an apparatus for producing fine particles 1 illustrated in FIG. 12. A liquid droplet discharging unit used was a liquid droplet discharging unit of a liquid column resonance type set to the following discharge conditions. Note that, four discharge holes were arranged in one liquid column resonance flow path.

Liquid Droplet Discharging Unit of a Liquid Column Resonance Type

The following liquid droplet discharging unit used was configured such that:
the length L between both ends of the liquid column resonance-generating liquid chamber 18 in the longitudinal direction thereof was 1.85 mm;
the resonance mode was N=2; and
the first to fourth discharge holes were arranged at positions corresponding to an antinode of a standing wave having a resonance mode where N=2.

A drive signal-generating source used was FUNCTION GENERATOR WF1973 (product of NF Corporation, Ltd.) and was connected to a vibration generating unit via a coated lead wire of polyethylene. The drive frequency was set to 340 [kHz] in accordance with the liquid resonance frequency.
[Collecting Unit]

A collecting unit used was a cylindrical chamber 61 having an inner diameter of 400 mm and a height of 2,000 mm. The chamber 61 was fixed along a vertical direction, and the top end portion and the bottom end portion thereof were narrowed. Also, the inner diameter of each of a gas flow inlet 62 and an outlet 63 was 50 mm.

The liquid droplet discharging unit 2 was disposed at the center of the chamber 61 at a position 300 mm distant from the top end of the chamber 61. Also, nitrogen gas of 30° C. was supplied at a velocity of 12.0 m/s in a horizontal direction with respect to the chamber 61. Note that, in Examples, this nitrogen gas is referred to as a coalescence preventing gas flow.

Example 1

The liquid droplet discharging unit was disposed so that a common liquid feeding path 17 was disposed at an upstream side of the coalescence preventing gas flow in a flowing direction thereof.

Table 1 presents the diameters of the four discharge holes in one liquid column resonance-generating liquid chamber and the pitch between the adjacent discharge holes in each of Examples and Comparative Examples. Table 1 also presents the initial discharge velocity of the liquid droplets under the conditions that the diameters of the discharge holes and the pitch between the adjacent discharge holes were set as presented therein. Note that, in each of Examples and Comparative Examples, the four discharge holes are described as discharge holes 1 to 4, where the discharge hole 1 is one located at the most upstream side of the coalescence preventing gas flow in the flowing direction thereof, the discharge hole 2 is one located at the second most upstream side thereof, the discharge hole 3 is one located at the third most upstream side thereof, and the discharge hole 4 is one located at the fourth most upstream side thereof, i.e., at the most downstream side thereof.

The prepared toner material liquid was discharged and solidified through drying in the chamber to form toner particles. The toner particles were collected by the cyclone collecting device, to thereby obtain a toner (base particles) of Example 1.

The obtained toner was measured for volume average particles diameter using a flow-type particle image analyzer (product of Sysmex Corporation; FPIA-3000). The measurement of the volume average particle diameter will be described below.

Figure 14:
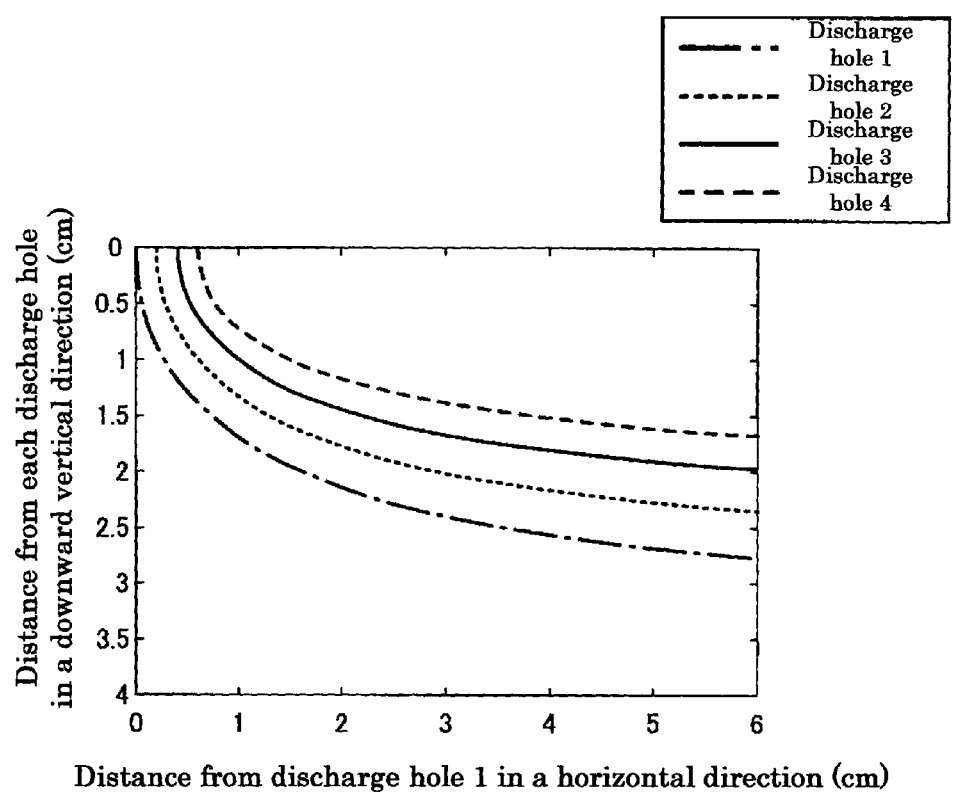
FIG. 14 is a graph of estimated trajectories of liquid droplets discharged under liquid droplet discharging conditions of Example 1.

FIG. 14 is a graph of estimated trajectories of the discharged liquid droplets under the liquid droplet discharging conditions of the present embodiment (Example 1). The trajectories of the discharged liquid droplets were calculated by developing the above Formula (7) every 2.0 μs with the Java language using a personal computer (product of LENOVO Corporation).

According to the particle size distribution of the fine particles discharged from the liquid droplet discharging unit and then solidified, the number of particles dried without coalescing was found to account for 90% (see Table 1), indicating that the rate of the coalesced particles is quite low. This result is thought to be reasonable considering the estimated trajectories of the discharged liquid droplets in FIG. 14 where the trajectories of the particles are not overlapped.

<<Thin Line Reproducibility>>

The thus-prepared developer was charged into a modified machine fabricated by modifying the developing device of a copier (IMAGIO NEO 271, product of Ricoh Company, Ltd.). Subsequently, running was performed using the above-modified machine and TYPE 6000 paper (product of Ricoh Company, Ltd.) at an image occupation rate of 7%. Then, the tenth image and the thirty thousandth image were compared in thin line portions with the original image. Specifically, these images were observed under an optical microscope at ×100, and evaluated on a one-to-four scale through comparison with a standard sample in terms of defects of a line. An image quality is higher as follows: A>B>C>D. In particular, the image evaluated as "D" is not a practically acceptable level. The results are presented in Table 1.

TABLE 1

| | Position of the common liquid feeding path 17 | Diameter of discharge hole [μm] | | | | Pitch between discharge holes [μm] | Initial discharge velocity [m/s] | | | | Dv [μm] | Rate of non-coalesced particles [%] | Image evaluation: thin line reproducibility |
| | | Upstream side | | Downstream side | | | Upstream side | | Downstream side | | | | |
| | | Discharge hole 1 | Discharge hole 2 | Discharge hole 3 | Discharge hole 4 | | Discharge hole 1 | Discharge hole 2 | Discharge hole 3 | Discharge hole 4 | | | |
|---|---|---|---|---|---|---|---|---|---|---|---|---|---|
| Ex. 1 | Upstream side | 10.0 | 11.2 | 12.5 | 14.0 | 200 | 12.0 | 10.2 | 8.7 | 7.4 | 5.2 | 90 | A |
| Ex. 2 | Upstream side | 10.0 | 11.2 | 12.5 | 14.0 | 150 | 13.0 | 11.7 | 10.5 | 9.5 | 5.4 | 87 | A |
| Ex. 3 | Downstream side | 10.0 | 10.0 | 10.0 | 10.0 | 200 | 12.0 | 10.8 | 9.2 | 7.8 | 5.5 | 84 | A |
| Ex. 4 | Downstream side | 10.0 | 11.2 | 11.2 | 11.2 | 200 | 12.0 | 10.8 | 10.8 | 10.8 | 5.5 | 80 | A |
| Ex. 5 | Downstream side | 10.0 | 10.0 | 11.2 | 11.2 | 200 | 12.0 | 12.0 | 10.8 | 10.8 | 5.5 | 80 | A |
| Comp. Ex. 1 | Downstream side | 10.0 | 10.0 | 10.0 | 10.0 | 100 | 12.1 | 11.6 | 11.2 | 10.7 | 6.9 | 51 | C |
| Comp. Ex. 2 | Upstream side | 10.0 | 10.0 | 10.0 | 10.0 | 150 | 12.1 | 12.7 | 13.3 | 14.0 | 6.4 | 31 | D |

Example 2

Liquid droplets were discharged in the same manner as in Example 1 except that the pitch between the discharge holes was changed as presented in Table 1. The discharge velocities of the liquid droplets (initial velocities) changed by changing the pitch between the discharge holes are presented in Table 1.

Figure 15:
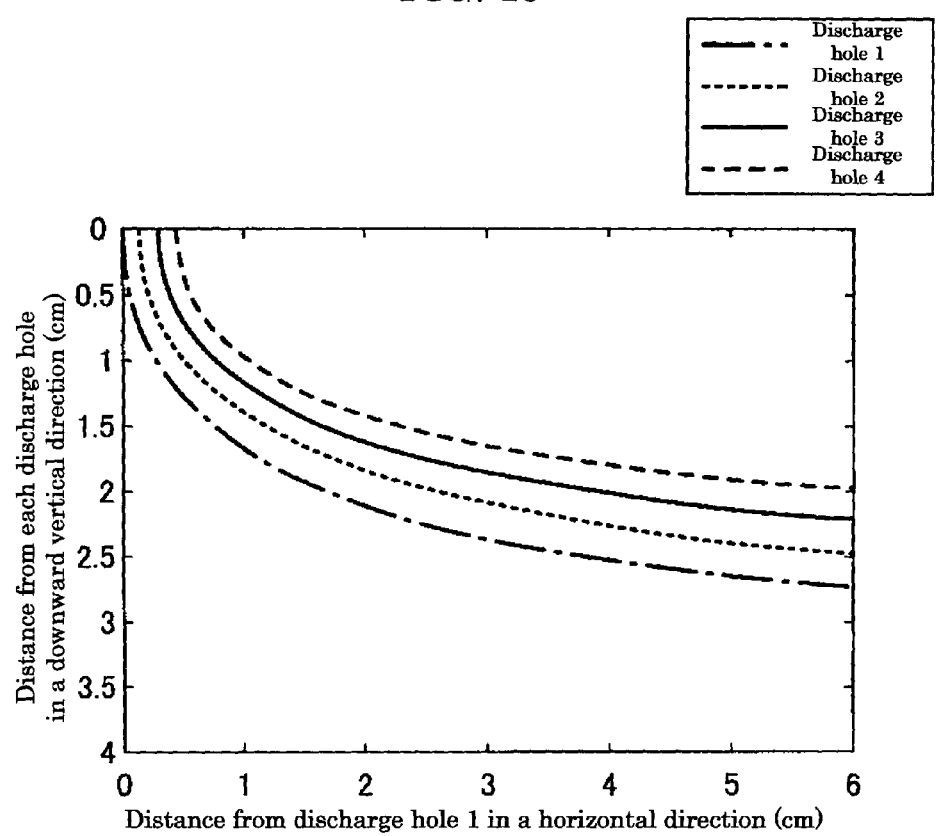
FIG. 15 is a graph of estimated trajectories of liquid droplets discharged under liquid droplet discharging conditions of Example 2.

FIG. 15 is a graph of estimated trajectories of the discharged liquid droplets under the liquid droplet discharging conditions of the present embodiment.

According to the particle size distribution of the fine particles discharged from the liquid droplet discharging unit and then solidified, the number of particles dried without coalescing was found to account for 87% (see Table 1), indicating that the rate of the coalesced particles is quite low. This result is thought to be reasonable considering the estimated trajectories of the discharged liquid droplets in FIG. 15 where the trajectories of the particles are not overlapped.

Example 3

Liquid droplets were discharged in the same manner as in Example 1 except that the diameters of the discharge holes were changed as presented in Table 1 and that the liquid droplet discharging unit was disposed so that the common liquid feeding path 17 was disposed at a downstream side of the coalescence preventing gas flow in a flowing direction thereof. The discharge velocities of the liquid droplets (initial velocities) changed by changing the diameters of the discharge holes are presented in Table 1.

Figure 16:
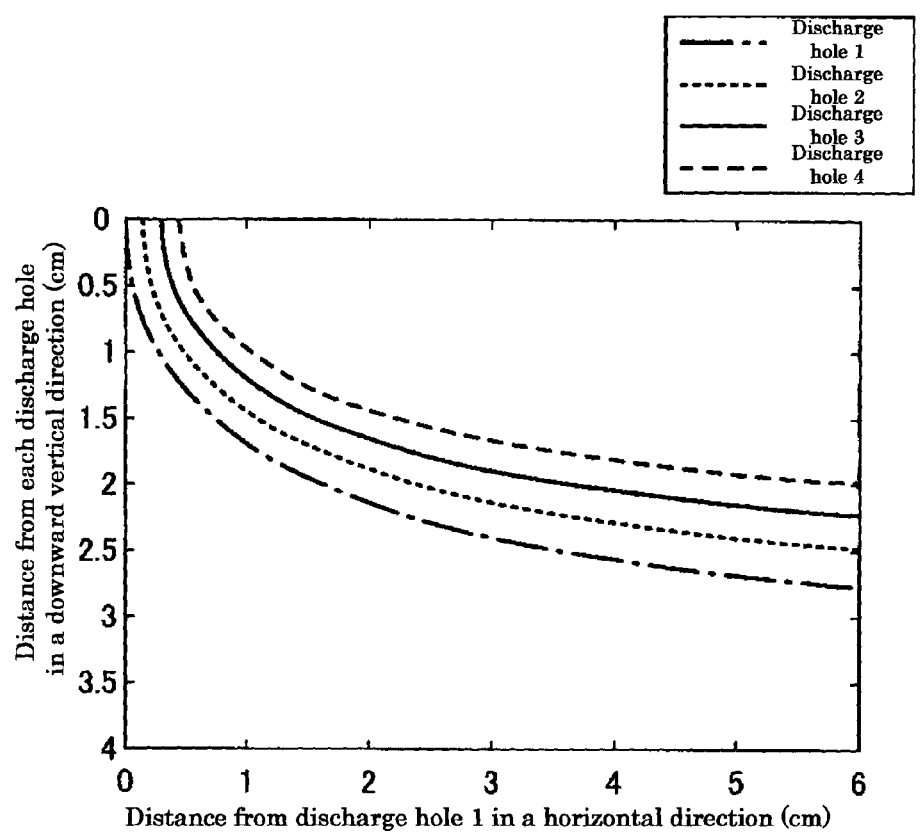
FIG. 16 is a graph of estimated trajectories of liquid droplets discharged under liquid droplet discharging conditions of Example 3.

FIG. 16 is a graph of estimated trajectories of the discharged liquid droplets under the liquid droplet discharging conditions of the present embodiment.

According to the particle size distribution of the fine particles discharged from the liquid droplet discharging unit and then solidified, the number of particles dried without coalescing was found to account for 84% (see Table 1), indicating that the rate of the coalesced particles is quite low. This result is thought to be reasonable considering the estimated trajectories of the discharged liquid droplets in FIG. 16 where the trajectories of the particles are not overlapped.

Example 4

Liquid droplets were discharged in the same manner as in Example 1 except that the diameters of the discharge holes were changed as presented in Table 1 and that the liquid droplet discharging unit was disposed so that the common liquid feeding path 17 was disposed at a downstream side of the coalescence preventing gas flow in a flowing direction thereof. The discharge velocities of the liquid droplets (initial velocities) changed by changing the diameters of the discharge holes are presented in Table 1.

According to the particle size distribution of the fine particles discharged from the liquid droplet discharging unit and then solidified, the number of particles dried without coalescing was found to account for 80% (see Table 1).

Example 5

Liquid droplets were discharged in the same manner as in Example 1 except that the diameters of the discharge holes were changed as presented in Table 1 and that the liquid droplet discharging unit was disposed so that the common liquid feeding path 17 was disposed at a downstream side of the coalescence preventing gas flow in a flowing direction thereof. The discharge velocities of the liquid droplets (initial velocities) changed by changing the diameters of the discharge holes are presented in Table 1.

According to the particle size distribution of the fine particles discharged from the liquid droplet discharging unit and then solidified, the number of particles dried without coalescing was found to account for 80% (see Table 1).

Comparative Example 1

Liquid droplets were discharged in the same manner as in Example 3 except that the pitch between discharge holes was changed as presented in Table 1.

Figure 17:
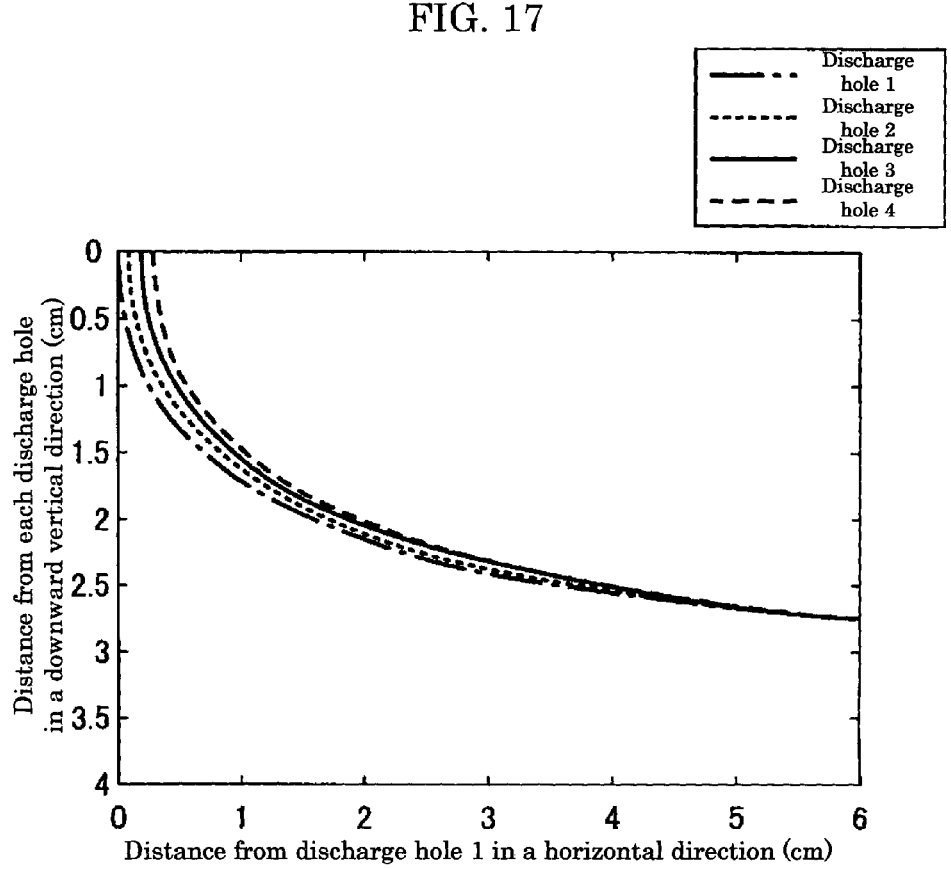
FIG. 17 is a graph of estimated trajectories of liquid droplets discharged under liquid droplet discharging conditions of Comparative Example 1.

FIG. 17 is a graph of estimated trajectories of the discharged liquid droplets under the liquid droplet discharging conditions of the present embodiment.

According to the particle size distribution of the fine particles discharged from the liquid droplet discharging unit and then solidified, the number of particles dried without coalescing was found to account for 51% (see Table 1), indicating that the rate of the coalesced particles is not satisfactory. This result is thought be due to partially overlapping of the trajectories of the discharged liquid droplets to increase the frequency of coalescence as presented in FIG. 17.

Comparative Example 2

Liquid droplets were discharged in the same manner as in Example 3 except that the pitch between discharge holes was changed as presented in Table 1 and that the liquid droplet discharging unit was disposed so that the common liquid feeding path 17 was disposed at an upstream side of the coalescence preventing gas flow in a flowing direction thereof.

Figure 18:
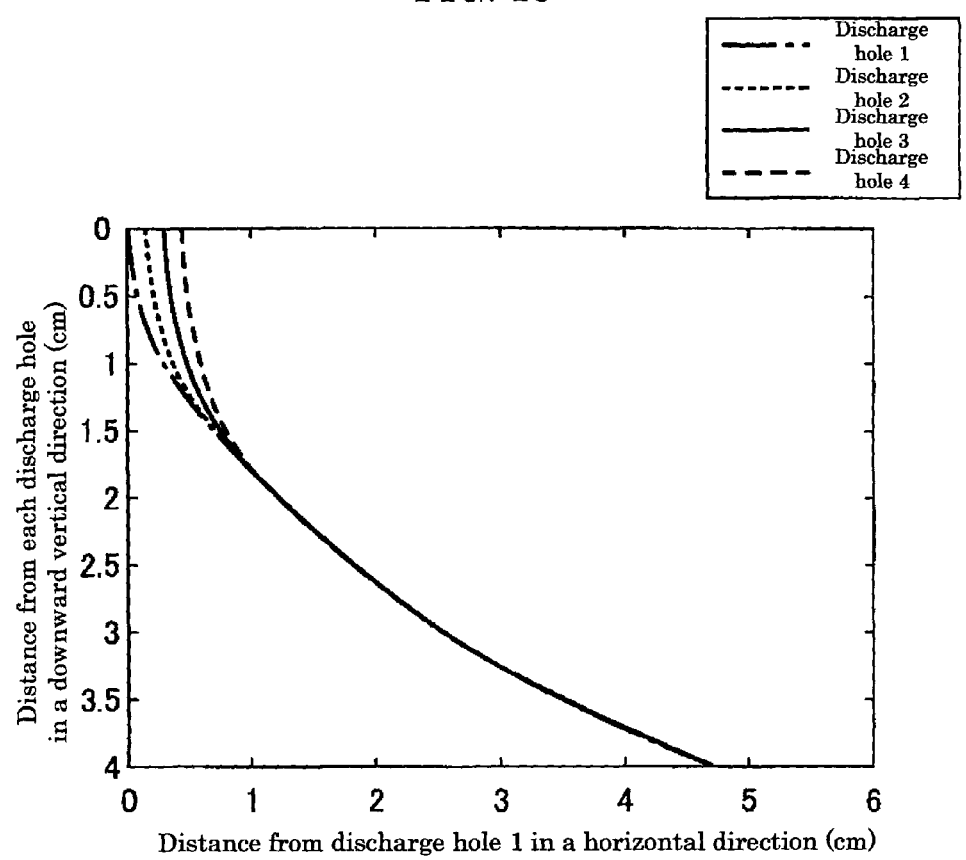
FIG. 18 is a graph of estimated trajectories of liquid droplets discharged under liquid droplet discharging conditions of Comparative Example 2.

FIG. 18 is a graph of estimated trajectories of the discharged liquid droplets under the liquid droplet discharging conditions of the present embodiment.

According to the particle size distribution of the fine particles discharged from the liquid droplet discharging unit and then solidified, the number of particles dried without coalescing was found to account for 31% (see Table 1), indicating that the rate of the coalesced particles is not satisfactory. This result is thought be due to completely overlapping of the orbits of the discharged liquid droplets to increase the frequency of coalescence. This result is thought be due to overlapping of the trajectories of the discharged liquid droplets immediately after discharging, so that the liquid droplets hit each other and coalesced together as presented in FIG. 18.

[Volume Average Particle Diameter]

A measurement method using a flow particle image analyzer will be described briefly. The volume average particle diameters of the toner, toner base particles and external additive can be measured using flow particle image analyzer FPIA-3000 (product of Sysmex Corporation) as the flow particle image analyzer.

First, water is caused to pass through a filter to remove fine dust so as to contain 20 or smaller particles per $10^{-3}$ cm$^3$, which have a circle-equivalent diameter of 0.60 μm or greater but smaller than 159.21 μm. Then, several drops of a nonionic surfactant (preferably, CONTAMINON N (product of Wako Pure Chemical Industries, Ltd.)) are added to 10 mL of the above-treated water. In addition, a measurement sample (5 mg) is added to the resultant liquid, followed by dispersing for 1 min with an ultrasonic disperser (e.g., UH-50 (product of STM Corporation)) at 20 kHz and 50 W/10 cm$^3$. Furthermore, the resultant dispersion liquid is dispersed for a total of 5 min so as to prepare a sample dispersion liquid containing 4,000 to 8,000 particles per $10^{-3}$ cm$^3$, which have a circle-equivalent diameter of 0.60 μm or greater but smaller than 159.21 μm. The thus-prepared dispersion liquid is used to measure the particle size distribution in terms of the circle-equivalent diameters thereof.

The circle-equivalent diameter can be calculated in the following manner, for example. Specifically, the sample dispersion liquid is caused to pass through a flow channel (extending in a flowing direction) of a flat transparent flow cell (thickness: about 200 μm). In order to form an optical path which passes through and intersects with the flow cell in the thickness direction, a stroboscope and a CCD camera are mounted on the flow cell so as to be located at the opposite side to each other. With the sample dispersion liquid flowing, strobe light is applied thereto at an interval of 1/30 sec so as to obtain an image of each particle flowing in the flow cell. As a result, each particle is photographed as a two-dimensional image having a certain area parallel to the flow cell. Based on the area of each particle in the two-dimensional image, the diameter of a circle having the same area is calculated as the circle-equivalent diameter.

With the above-described method, the circle-equivalent diameters of 1,200 or more particles can be measured for about 1 min. The number of the particles based on the distribution of the circle-equivalent diameters can be measured. Similarly, the rate (number %) of particles with a predetermined circle-equivalent diameter can be measured. As presented in Table 1, the results (frequency % and cumulative %) can be obtained by dividing a range of 0.06 μm to 400 μm into 226 channels (dividing 1 octave into 30 channels). The actual measurement is performed on particles having a circle-equivalent diameter of 0.60 μm or greater but smaller than 159.21 μm.

As described above, the method of the present embodiment for producing fine particles controls the distribution of the initial velocities of the liquid droplets discharged from a plurality of discharge holes in the liquid column resonance-generating liquid chamber 18, to thereby effectively prevent coalescence between the discharged liquid droplets. That is, this method makes it possible to provide an apparatus for producing fine particles which is provided with a plurality of discharge holes and is excellent in productivity. Also, applying the method for producing fine particles to a method for producing a toner can discharge toner particles continuously and stably without clogging of discharge holes, and the obtained toner particles have a particle diameter of 5 μm which is sufficiently small. Furthermore, a toner excellent in thin line reproducibility can be obtained.

Aspects of the present invention are, for example, as follows.

<1> A method for producing fine particles, including:
discharging a fine particle material liquid, where solid materials to be formed into fine particles are dissolved or dispersed in a solvent or are melted, from two or more discharge holes in a downward vertical direction, to thereby form liquid droplets; and
solidifying the liquid droplets discharged to form fine particles,
wherein in the discharging a fine particle material liquid, gas flow is supplied at an angle of greater than 0° but 90° or smaller with respect to the downward vertical direction, and
wherein an initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof.

<2> The method for producing fine particles according to <1>,
wherein in at least one of adjacent pairs of the discharge holes in the two or more discharge holes, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$.

<3> The method for producing fine particles according to <2>,
wherein the at least one of adjacent pairs of the discharge holes are a pair of the discharge hole located at the most upstream side of the gas flow in the flowing direction thereof and the discharge hole adjacent to the discharge hole located at the most upstream side of the gas flow in the flowing direction thereof.

<4> The method for producing fine particles according to <1>,
wherein in each of the adjacent pairs of the discharge holes in the two or more discharge holes, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$.

<5> The method for producing fine particles according to any one of <1> to <4>,
wherein the discharge hole located at the downstream side of the gas flow in the flowing direction thereof has an opening diameter $D_1$ and the discharge hole located at the upstream side of the gas flow in the flowing direction thereof has an opening diameter $D_2$, where the opening diameter $D_1$ is equal to or greater than $1.1 \times D_2$.

<6> The method for producing fine particles according to any one of <1> to <5>,
wherein the gas flow is supplied at an angle of 90° with respect to the downward vertical direction.

<7> The method for producing fine particles according to any one of <1> to <6>,
wherein the discharging a fine particle material liquid is applying vibration to the fine particle material liquid in a liquid column resonance-generating liquid chamber containing the two or more discharge holes to thereby form a standing wave through liquid column resonance, and discharging the fine particle material liquid from the discharge holes located in a region corresponding to an antinode of the standing wave to thereby form liquid droplets.

<8> The method for producing fine particles according to <7>,
wherein a frequency f of the vibration satisfies a relationship: $N \times c/(4L) \leq f \leq (N+1) \times c/(4Le)$,
where L denotes a length of the liquid column resonance-generating liquid chamber in a longitudinal direction thereof, Le denotes a distance between an end portion of the liquid column resonance-generating liquid chamber at a side of a supply path for supplying the fine particle material liquid to the liquid column resonance-generating liquid chamber and the discharge hole closest to the end portion thereof, c denotes a velocity of a sound wave in the fine particle material liquid, and N is an integer.

<9> The method for producing fine particles according to any one of <1> to <8>,
wherein the initial discharge velocities of the liquid droplets are lower than a velocity of the gas flow.

<10> The method for producing fine particles according to any one of <1> to <9>,
wherein the initial discharge velocities of the liquid droplets discharged from the two or more discharge holes are adjusted by changing pitches between the discharge holes or opening diameters of the discharge holes.

<11> An apparatus for producing fine particles, including:
a gas flow generating unit configured to generate gas flow having an angle of greater than 0° but 90° or smaller with respect to a downward vertical direction;
a gas flow path through which the gas flow generated by the gas flow generating unit flows; and
a liquid droplet discharging unit containing two or more discharge holes and configured to discharge, to the gas flow path, a fine particle material liquid where solid materials to be formed into fine particles are dissolved or dispersed in a solvent or are melted,
wherein an initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof.

REFERENCE SINGS LIST

1: Fine particle producing apparatus
2: Liquid droplet discharging unit
9: Elastic plate
10: Liquid column resonance-based liquid droplet discharging unit
11: Liquid droplet discharging unit of a liquid column resonance type
12: Gas flow path
13: Raw material container
14: Toner material liquid
15: Liquid circulating pump
16: Liquid feeding tube
17: Common liquid feeding path
18: Liquid column resonance-generating liquid chamber
19: Discharge hole
20: Vibration generating unit
21: Liquid droplets

The invention claimed is:

1. A method for producing fine particles, comprising:

discharging a fine particle material liquid, where solid materials to be formed into fine particles are dissolved or dispersed in a solvent or are melted, from two or more discharge holes in a downward vertical direction, to thereby form liquid droplets; and solidifying the liquid droplets discharged to form fine particles, wherein in the discharging the fine particle material liquid, a gas flow is supplied at an angle of greater than 0° but 90° or smaller with respect to the downward vertical direction, and wherein an initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof;

wherein in at least one of adjacent pairs of the discharge holes in the two or more discharge holes, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9\times V_2$.

2. The method according to claim 1, wherein the at least one of adjacent pairs of the discharge holes are a pair of the discharge hole located at the most upstream side of the gas flow in the flowing direction thereof and the discharge hole adjacent to the discharge hole located at the most upstream side of the gas flow in the flowing direction thereof.

3. The method according to claim 1, wherein in each of the adjacent pairs of the discharge holes in the two or more discharge holes, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9\times V_2$.

4. The method according to claim 1, wherein the discharge hole located at the downstream side of the gas flow in the flowing direction thereof has an opening diameter $D_1$ and the discharge hole located at the upstream side of the gas flow in the flowing direction thereof has an opening diameter $D_2$, where the opening diameter $D_1$ is equal to or greater than $1.1\times D_2$.

5. The method according to claim 1, wherein the gas flow is supplied at an angle of 90° with respect to the downward vertical direction.

6. The method according to claim 1, wherein the discharging the fine particle material liquid comprises applying vibration to the fine particle material liquid in a liquid column resonance-generating liquid chamber comprising the two or more discharge holes to thereby form a standing wave through liquid column resonance, and discharging the fine particle material liquid from the discharge holes located in a region corresponding to an antinode of the standing wave to thereby form liquid droplets.

7. The method according to claim 6, wherein a frequency f of the vibration satisfies a relationship: $N\times c/(4L)\leq f\leq(N+1)\times c/(4Le)$, wherein L is a length of the liquid column resonance-generating liquid chamber in a longitudinal direction thereof, Le is a distance between an end portion of the liquid column resonance-generating liquid chamber at a side of a supply path for supplying the fine particle material liquid to the liquid column resonance-generating liquid chamber and the discharge hole closest to the end portion thereof, c is a velocity of a sound wave in the fine particle material liquid, and N is an integer.

8. The method according to claim 1, wherein the initial discharge velocities of the liquid droplets are lower than a velocity of the gas flow.

9. The method according to claim 1,
wherein the initial discharge velocities of the liquid droplets discharged from the two or more discharge holes are adjusted by changing pitches between the discharge holes or opening diameters of the discharge holes.

10. An apparatus, comprising:
a gas flow generating unit configured to generate gas flow having an angle of greater than 0° but 90° or smaller with respect to a downward vertical direction;
a gas flow path through which the gas flow generated by the gas flow generating unit flows; and
a liquid droplet discharging unit comprising two or more discharge holes and configured to discharge, to the gas flow path, a fine particle material liquid where solid materials to be formed into fine particles are dissolved or dispersed in a solvent or are melted,
wherein an initial discharge velocity of the liquid droplets discharged from the discharge hole located at an upstream side of the gas flow in a flowing direction thereof is equal to or higher than an initial discharge velocity of the liquid droplets discharged from the discharge hole located at a downstream side of the gas flow in the flowing direction thereof;
wherein in at least one of adjacent pairs of the discharge holes in the two or more discharge holes, the liquid droplets discharged from the discharge hole located at the downstream side of the gas flow in the flowing direction thereof have an initial discharge velocity $V_1$ and the liquid droplets discharged from the discharge hole located at the upstream side of the gas flow in the flowing direction thereof have an initial discharge velocity $V_2$, where the initial discharge velocity $V_1$ is equal to or smaller than $0.9 \times V_2$.

* * * * *